US011568739B2

(12) United States Patent
McNicholas

(10) Patent No.: US 11,568,739 B2
(45) Date of Patent: Jan. 31, 2023

(54) VAPOR DISPLACEMENT REFUELING INCLUDING ONBOARD INTERNALLY RECIRCULATING CHEMICAL LOOPING COMBUSTION SYSTEM

(71) Applicant: Daniel McNicholas, Palos Park, IL (US)

(72) Inventor: Daniel McNicholas, Palos Park, IL (US)

( * ) Notice: Subject to any disclaimer, the term of this patent is extended or adjusted under 35 U.S.C. 154(b) by 0 days.

(21) Appl. No.: 17/145,368

(22) Filed: Jan. 10, 2021

(65) Prior Publication Data
US 2022/0176316 A1   Jun. 9, 2022

Related U.S. Application Data

(60) Provisional application No. 62/959,840, filed on Jan. 10, 2020, provisional application No. 62/959,830, (Continued)

(51) Int. Cl.
*B01D 53/94* (2006.01)
*H01M 8/04007* (2016.01)
(Continued)

(52) U.S. Cl.
CPC ............. *G08C 25/00* (2013.01); *B01D 46/04* (2013.01); *B01D 53/9431* (2013.01); *B04C 9/00* (2013.01); *B67D 7/04* (2013.01); *B67D 7/64* (2013.01); *B67D 7/78* (2013.01); *G08C 17/02* (2013.01); *G08C 19/00* (2013.01);
(Continued)

(58) Field of Classification Search
CPC ... B04C 9/00; H01M 8/04074; H01M 8/0606; H01M 8/0618
See application file for complete search history.

(56) References Cited

U.S. PATENT DOCUMENTS 9,371,227 B2 *  6/2016  Fan ..................... H01M 8/0643
2004/0153701 A1  8/2004  Pickell
(Continued)

FOREIGN PATENT DOCUMENTS

RU     2133696 C1     7/1999

OTHER PUBLICATIONS

PCT International Search Rpt and Written Opinion—dated Jun. 16, 2022.

*Primary Examiner* — Stewart A Fraser
(74) *Attorney, Agent, or Firm* — Clifford H. Kraft

(57) ABSTRACT

A multiply redundant safety system that protects humans and assets while transfer(s)/fueling of on road/off road, rail, marine, aircraft, spacecraft, rockets, and all other vehicles/vessels utilizing Compressed and or Liquefied Gas Fuels/compound(s). Utilizing Natural Gas Chemical Family of Hydrogen/Propane/ethane/ammonia/and any mixtures along with or with out oxidizer(s), such as Liquefied Oxygen, Oxygen Triplet (O3)/ozone/hydrogen peroxide/peroxide/solid oxidizer(s) one or more processors, utilizing Artificial Intelligence techniques/machine learning in combination with one or more sensors; in combination with one or more micro switches/actuator(s) combine to detect any leaks/fire(s)/or explosion hazards/vehicle motion/arc's, spark(s)/ and other hazards for quickly mitigating/locking out/stopping fueling/gas/transfers/vehicle releasing system(s).

19 Claims, 14 Drawing Sheets

Related U.S. Application Data filed on Jan. 10, 2020, provisional application No. 62/959,824, filed on Jan. 10, 2020.

(51) Int. Cl.
| | |
|---|---|
| *H01M 8/0612* | (2016.01) |
| *H01M 8/0606* | (2016.01) |
| *G08C 25/00* | (2006.01) |
| *G08C 19/00* | (2006.01) |
| *G08C 17/02* | (2006.01) |
| *B67D 7/04* | (2010.01) |
| *B67D 7/64* | (2010.01) |
| *B67D 7/78* | (2010.01) |
| *B01D 46/04* | (2006.01) |
| *B04C 9/00* | (2006.01) |
| *F01N 3/20* | (2006.01) |

(52) U.S. Cl.
CPC ..... *H01M 8/04074* (2013.01); *H01M 8/0606* (2013.01); *H01M 8/0618* (2013.01); *B04C 2009/002* (2013.01); *F01N 3/2066* (2013.01); *F01N 2610/02* (2013.01); *G08C 2201/63* (2013.01)

(56) References Cited

U.S. PATENT DOCUMENTS

| | | | |
|---|---|---|---|
| 2007/0265733 A1 | 11/2007 | Harrell | |
| 2008/0064328 A1 | 3/2008 | Wesel | |
| 2012/0171588 A1* | 7/2012 | Fan | H01M 8/0618 429/417 |
| 2015/0047465 A1* | 2/2015 | Langley | C10J 3/84 266/200 |
| 2017/0141421 A1* | 5/2017 | Sundaram | H01M 8/04097 |

* cited by examiner

VAPOR DISPLACEMENT REFUELING INCLUDING ONBOARD INTERNALLY RECIRCULATING CHEMICAL LOOPING COMBUSTION SYSTEM

This application claims priority from provisional patent application Nos. 62/959,824, 62/959,830 and 62/959,840 which are hereby incorporated by reference in their entireties.

BACKGROUND

Field of the Invention

The present invention relates generally to refueling safety and more particularly to refueling safety for refueling land vehicles, barges, ships, spacecraft and any other type of vehicle. In particular, communications aspects of safety systems.

Description of the Problem Solved

Clean fuels are emerging globally. Natural Gas, Hydrogen, Propane, Ethane, and Ammonia plus derivatives and mixtures from Bio-methane/Hythane/Synthetic Gas and any gas supplied from algae. Cultivating algae is a promising clean fuel/fuel mixture to assist in lowering the carbon emissions. The planet earth's population keeps increasing, along with this Increase, is the fact that our Transportation/Work vehicles needs will also increase. Utilizing Clean, Safe, Natural Gas and/or Hydrogen/Propane/Ethane/Ammonia and/or it's derivatives/compounds will benefit all. The use of Bio-methane/Bio-gas alone or mixed with methane/Hydrogen mixed with methane (Hythene) has positive carbon reduction results. Landfills, farms, and municipal waste plants are all sources of Bio-gas. All of these fuel(s)/mixtures are an abundant source of fuel.

Safely fueling and or transferring compressed and or liquefied gaseous materials can be challenging, first they have a low vapor pressure, therefore to maintain liquid state they must be kept under pressure, and some require cryogenic temperature to maintain liquid state. These properties, cryogenic liquefied gas, require specialized handling/equipment to properly contain/transfer/fuel with, weather transfer/fueling system is onboard vehicle/vessel/land based. Safety is paramount, protecting life and asset must be the number one priority, and all parties from Government regulators, Insurance Industry, Suppliers, to end users need to understand the Safety culture necessary to handle compressed/liquefied gas fueling/transfer(s). Utilizing modern technology, such as Artificial/Synthetic Intelligence, with state of the art equipment, will diminish opportunity for accidents to occur. Clean emissions, from clean fuels, from clean safe transfers, will contribute to Clean Air for all.

/=and/or Virgule means and/or through-out the body of work.

There are also multiple different systems/paths for fuel consumption. The combustion engine has been vastly improved to increase efficiency and reduce emissions, now achieving near zero emissions. The vehicle emission reductions, when quantified, are substantial, and clean fuels are a key component of the reductions. There are also turbines/micro-turbines, rotary engines, and various types of fuel cells. Fuel cell efficiency as well as internal combustion, may also be improved with increased oxygen % percentage(s) of system intake. Oxygen/Natural Gas/Hydrogen/Propane/ethane/ammonia (NGHPETA/O) may be separated, and or produced onboard or it may be supplied as a compressed/liquefied gas; also, any onboard reformer/gas cleaving cleaving/separation process onboard is also with-in the scope of this invention; such as stripping H2 out from CH-4, by high temp./steam cracking/reformer on the vehicle, for use as fuel/fuel-compound/oxidizer.

SUMMARY OF THE INVENTION

The present invention relates to an Onboard Internally Recirculating Chemical Looping Combustion System (IR-CLCS) process makes use of oxygen carriers, such as metal oxides, which are circulated and/or re-circulate, by pneumatic transfer and gravity. The metal oxides are oxidized in the oxidizer reformer, which oxidizes and transfers via (Bed) Air Blower (AB) up to a cyclone vessel, and then dropped via gravity due to decrease of flow rate; of feet per second (FPS), drop-off due to greater volume of cyclone. The angled cyclone, greater than the angle of repose, will ensure metal oxides fall into the "KAT SEAL", via gravity. A flue outlet at top of cyclone will capture system heat and transfer to the optional pre and post super heater headers, the flue gas may be drawn downward via an induced draft fan with variable speed control, this inverted heat trap is designed for system heat capture, may also contain an optional aqueous ammonia injection system for NOX reduction, along with an automatic self cleaning, (bag) filtering system.

DESCRIPTION OF THE PREFERRED EMBODIMENTS

Figure 1:
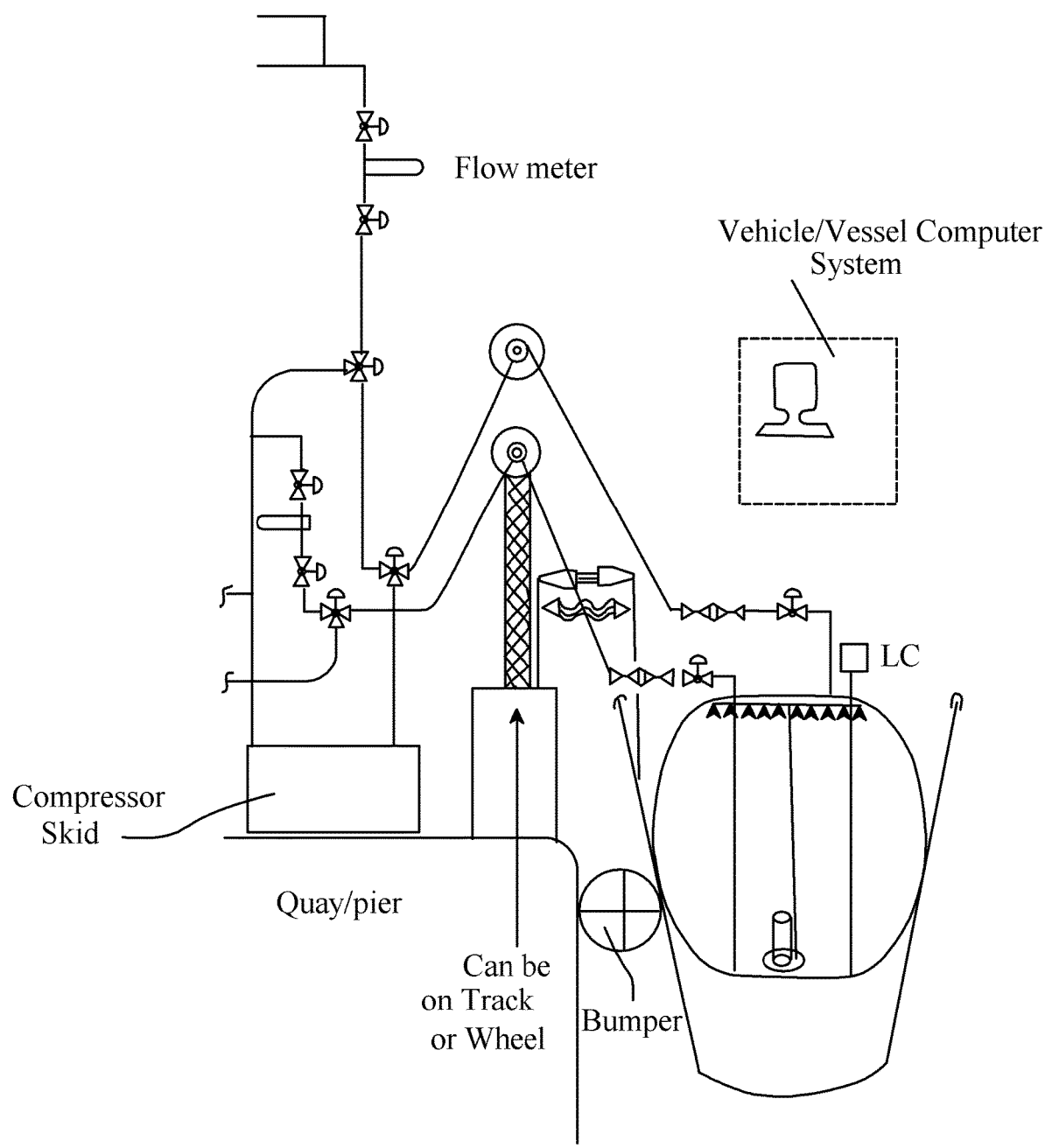
FIG. 1 shows a ship refueling system with valves.
Figure 2:
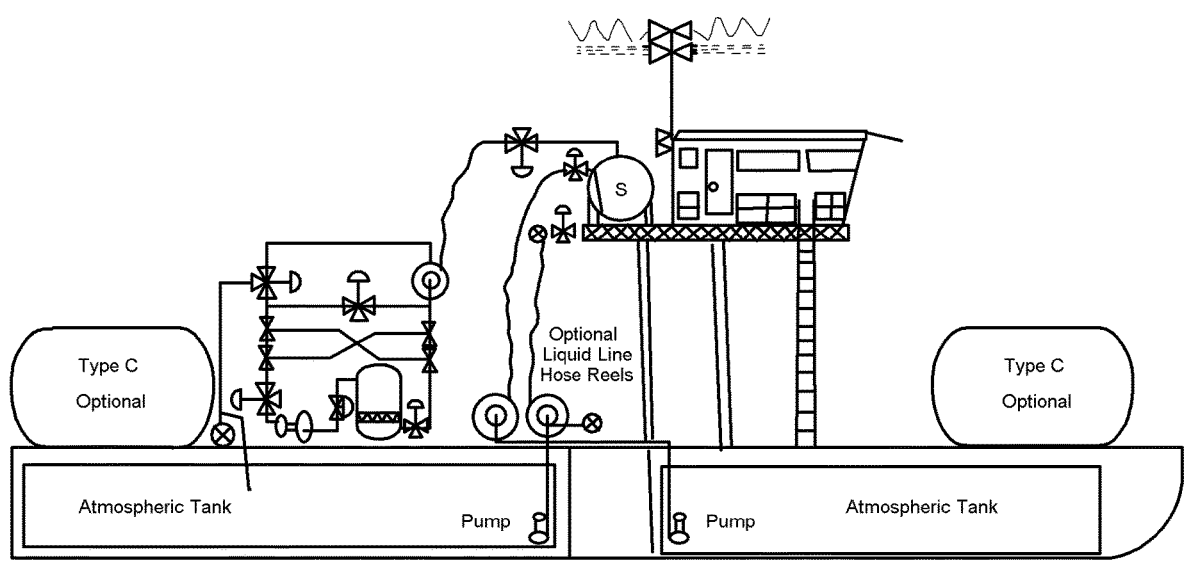
FIG. 2 shows a barge refueling system.
Figure 3:
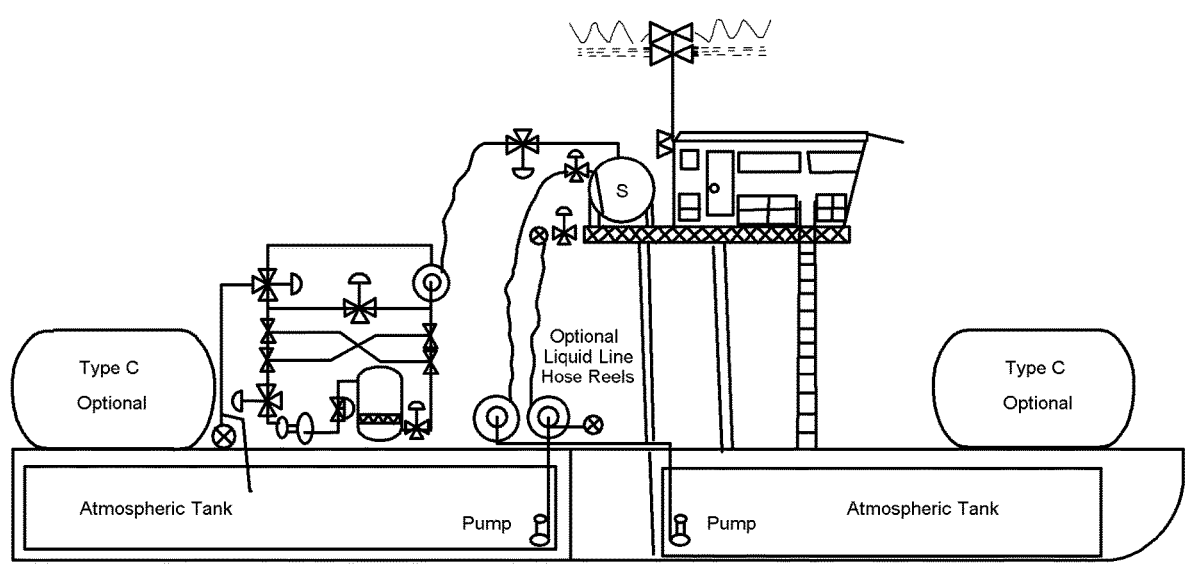
FIG. 3 shows another embodiment of a barge refueling system.
Figure 4:
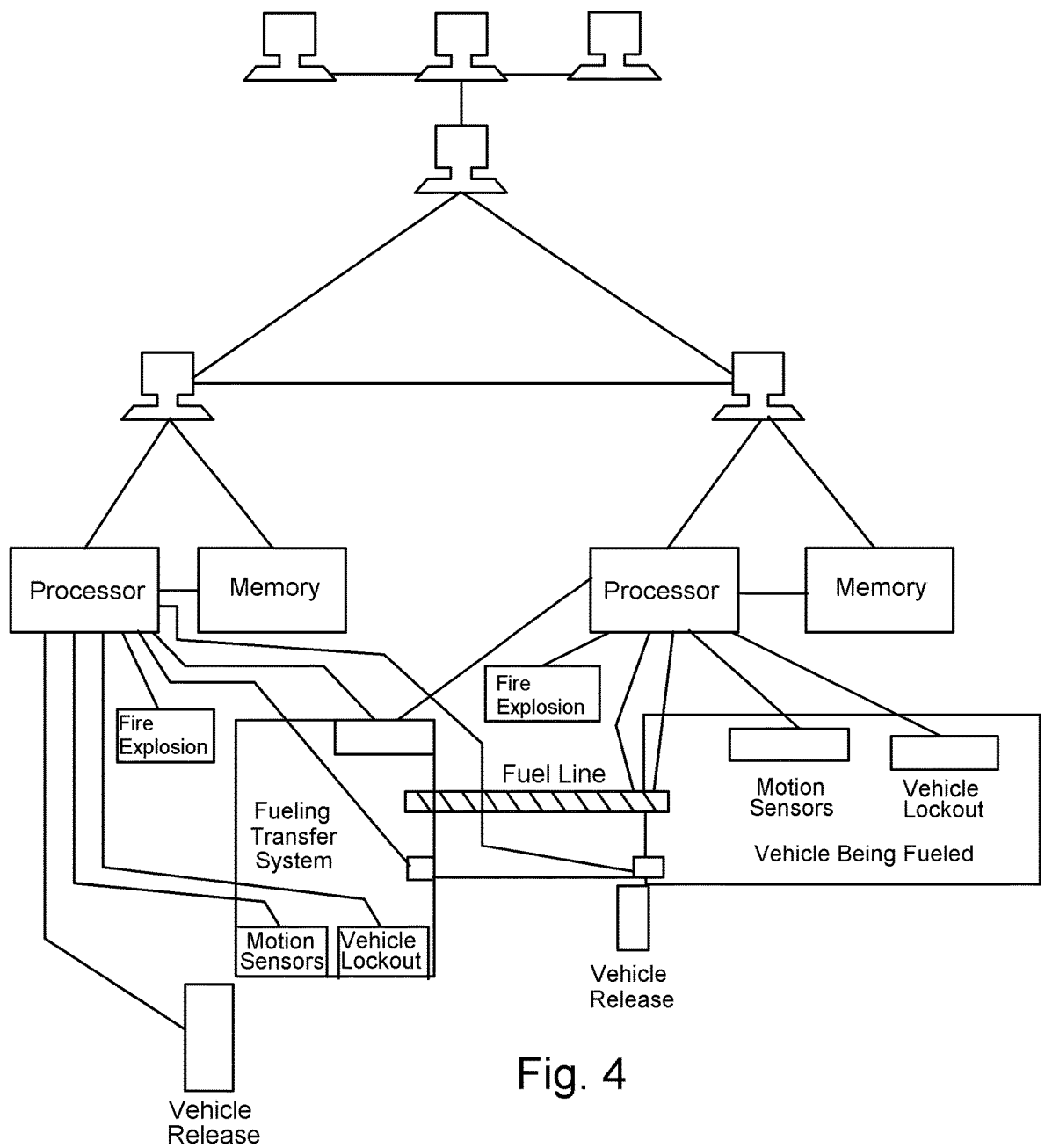
FIG. 4 shows a redundant fueling safety system.
Figure 5:
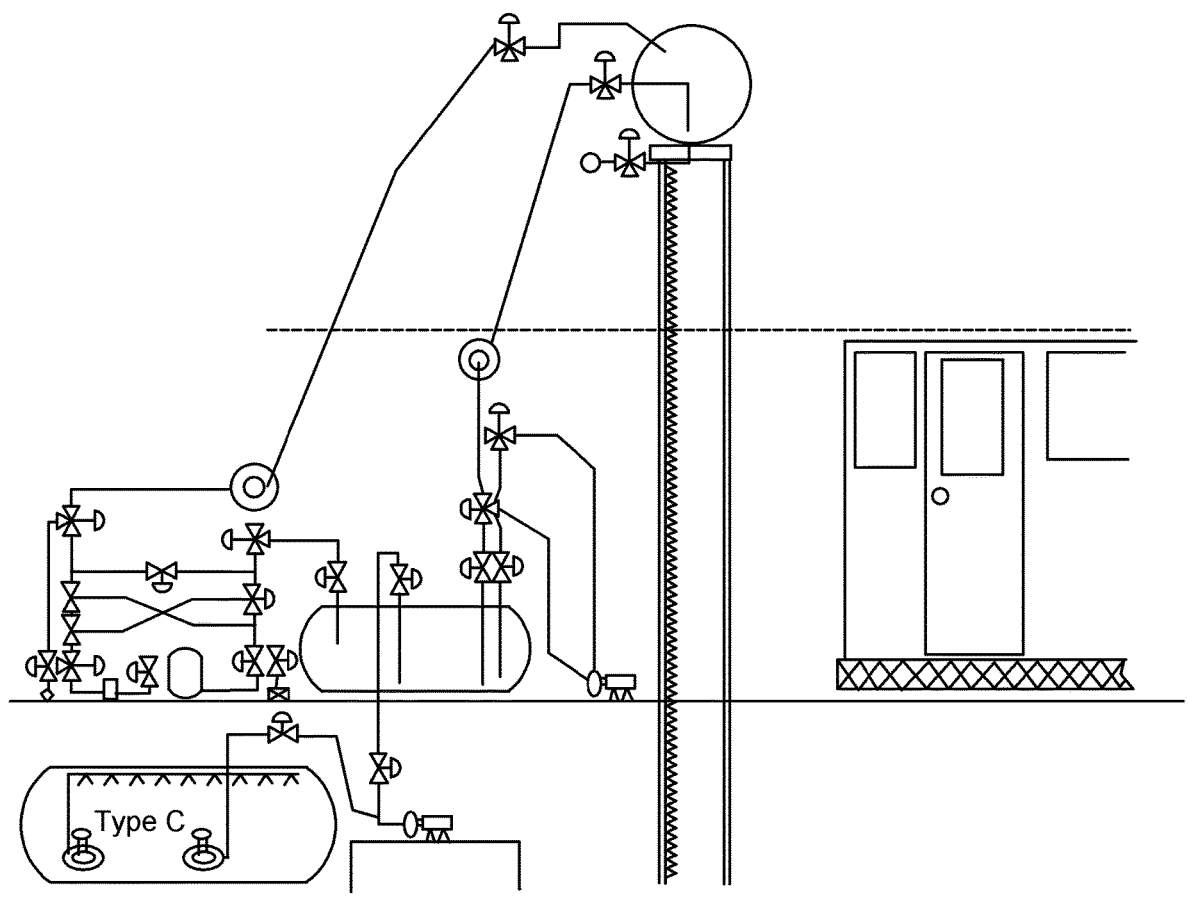
FIG. 5 shows a surge tank system with valves.
Figure 6:
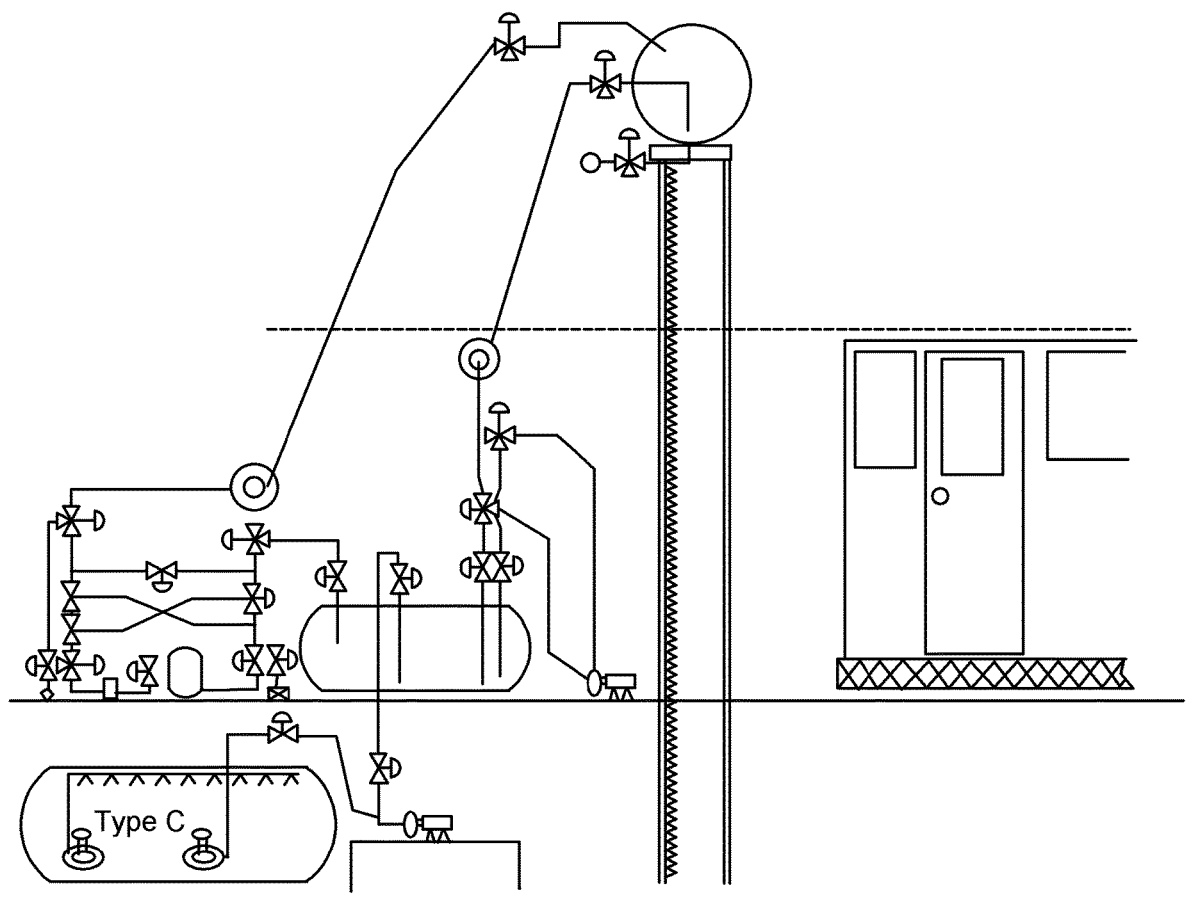
FIG. 6 shows another embodiment of a surge tank system with valves.
Figure 7:
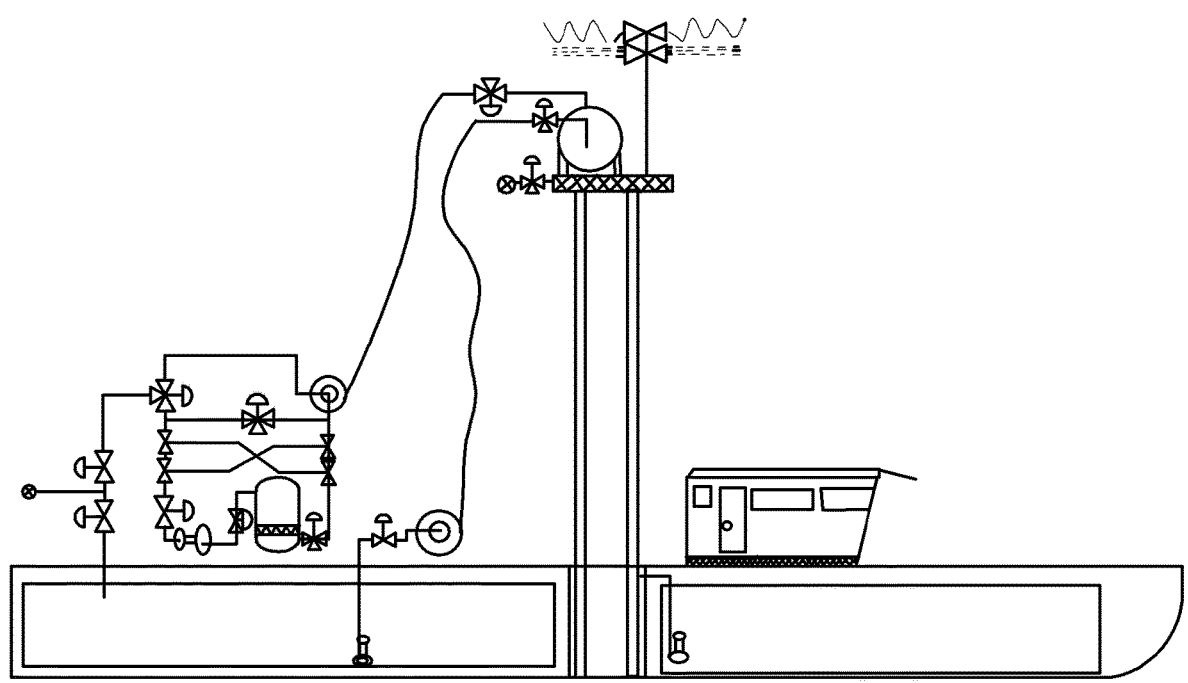
FIG. 7 shows an embodiment of a refueling system in an raised configuration.
Figure 8:
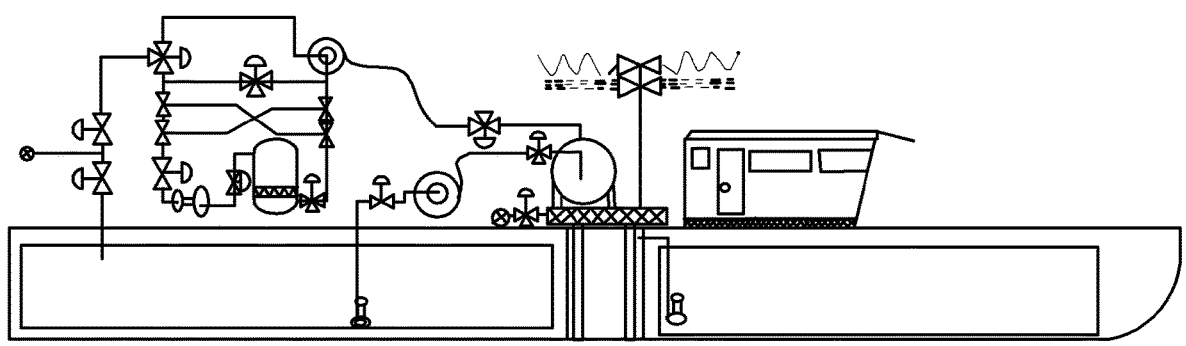
FIG. 8 shows an embodiment of a refueling system in an lowered configuration.

The control system/computerized automated/semi-automated/manual system(s) will network locally and remotely, communication/data communications may be achieved by wire/coax/coax R.F./RFoF/wirelessly by radio and/or light; such as Optical wirelessly communications, (OWC) and/or any combination of the listed methods. This includes fiber optic cables, fiber optic sensor(s), radio/optical communication/data interfaces, radio waves, coax, coax R.F., radio to optical conversions, optical to radio conversions, data to radio conversions, radio to data, any local radio/optical transmissions/receivers, Radio Frequency over Optical (RFoF)/any light transmissions/receivers, multiple frequencies, multiple wavelengths, multiple combinations of light and/or radio, between fueling/transfer(s) system, land based, and vehicle(s) or vehicle to vehicle, if fueling system is on a vessel. Plus, utilizing a voting/polling program/system; whereby three communications/methods may be utilized, for example two radio signals (different frequencies) and a hard-wire or fiber optic back up, if any one fails, the other two are voted/polled to ensure communications are valid; system(s) continues operations; if two communication of the three are lost, voting/polling will signal an interruption, thus a signal out put; and an ESD emergency shut-down trip will occur. The voting/polling by ⅔ two of three communication link(s) must be active, this will reduce spurious trips, and communication errors. Any combination of wired/wirelessly by radio/light may be included in the voting/polling proof of communication system functioning system. Also, Transmission Control Protocol/Internet Protocol TCP/IP is dependable, robust, communications and may also serve alone or in parallel, for communication/information data transmission/receiving.

Networks may be local area networks (LAN) or Wide/remote networks (WAN). Modern communication systems more available, private/leased communication system(s) will benefit Gas/Liquefied Gas transfer systems with protections from cyber-crimes. Satellite systems can provide the privacy, and redundancy, for example, the means of fiber re-routing during times of interference such as weather events. Switching, both by route, and method, coax/coax R.F./RFoF/Radio/light/OWC provides redundant methods, and/or routes to gather/analyze/live stream video/information/data about clients, shipments, transfers, durations, delays, volume(s), safety systems, operations systems, operational safety status, vehicle information, arrival times, possible bottlenecking, and many more data points/data information related to liquefied/compressed gas transfers. Satellite communications systems is an excellent option for ships transiting the globe; and fueling/transfer(s) of liquefied/compressed gas may occur at sea, satellite communications can be by radio/optical/both standing alone and/or combined for robust communications.

The control system/transfer area/vehicle/vessels may have adjustable antennae for radio/light transmission and/or reception. The adjustable antennae can be manual/automatic, the antennae/dish/transmitter/receiver may be local and/or remote communications such as by satellite/vehicle to vehicle. This will be advantageous for signal strength during communications. Proper communications will benefit all parties with back-up/uninterrupted communications.

State of the art transfers will include the use of Artificial Intelligence, Machine learning, or Deep learning utilizing high speed imaging or the use of digital high speed camera(s); photodiode/array sensors that include both the visual and non-visual spectrum (such as I.R.) to input photo imaging into processors for deep processor learning or "Machine learning". Repetitive vehicle/vessel fueling/transfers can benefit, data recall will inform system(s)/files, on physical data, as well as preparation documentation and check-list, and more. Repetitive motions, Steps, or processes are "Learned" by processor, and repetitive actions and/or responses are then learned and acted upon as learned. Other Optical, magnetic, and ultrasonic inputs are also included in the body of this invention. Deep learning utilizes one or more inputs for algorithms to process information inputs, then learns (deep learning) the inputs and outputs required to perform the/multiple task(s)/task, thereby creating its own step by step "code/coding and/or Flowcharting". Deep learning and/or machine learning may be performed by Graphic Processor(s) Units but can also utilize Quantum computing on a Quantum bus or network. Quantum logic gates and networks are safer due to validation process capabilities within the system. Quantum networks may be LAN (local area networks) or they may be WAN (wide area networks) wirelessly connected to multiple different networking systems via satellite by Radio and/or fiber optic links/optical wireless networks/and/or any combination of radio and/or light. Analog or digital signals are both conditioned and fed, which are processed into complex algorithms which decipher input signals and determine precise outputs for repetitive/motions and/or actions, and quantum/GPUPU(s) computing enhanced with optical/coax/coax R.F./RFoF (Radio Frequency over Fiber Optic) network(s)/computing with high bandwidth on the bus/network, computing at speeds in which these sophisticated algorithms compute in real time, therefore allowing the artificial intelligence to function at high real time speed. Having an array of GPU/GPUPU/Quantum processors (including linear array) is also with-in the scope of this invention, or any standard binary processor(s). Also any computer system that may communicate with the processor(s) such as graphics processors (GPU) plus GPUPU-graphics processing unit with processing unit(s). Sensors such as accelerometer (optical or magnetic) with three dimension (tri-axial accelerometer(s)) motion, and/or multiple accelerometers coupled to a processor to compute three dimensional motion(s)/inertial motion unit(s) for detection/signaling omni-vector motion/movement/distances, on land/at sea, plus photodiodes/arrays and/or Infrared photodiodes/arrays with high speed photo capabilities, and/or optical (filtered) high speed imaging with Infrared capabilities, which utilizes analog or digital imaging as an input. Cellular Visual Micro processing/Digital image processing/camera image processing may also be utilized for inputs.

Many different systems and components make up complex compressed/liquefied gas fueling/transfer(s), they all participate/communicate in a intelligent control system/network. Inputs/outputs, such as electrical starters, contactor(s), transfer switches, transformer(s), inverter(s), UPS systems(s)—w/bypass, batteries (stacks/bank(s)) relay(s)(multiple design, style, contacts, voltages, poles, coils) auxiliary relays/contact(s), ampere(s) detector, voltage detector(s), actuator(s), processor(s), micro-controller(s), remote terminal unit(s), computers, computer peripherals (mouse, touch screen, monitor(s), keyboard/keypad (magnetic/optical) magnetic reader, optical reader, mouse (optical/magnetic), Track/roller ball (mouse), joy-stick, controller, microphone, printer(s), Ink cartridges, monitor(s), display(s), speaker(s)), power supply, central processing unit (CPU), sequencer/micro-sequencer, hard drives, power supplies, main boards, optical/magnetic drives, optical/magnetic readers, graphics processing unit (GPU), general purpose graphics processing unit-(GPGPU), external GPU (EGPU), integrated graphics processing unit(s)(IGPU), memory, hard drive, flash drive, cd/dvd drive, modem, router(s), software, firmware, application software, App's, operating system(s), cloud storage, cloud computing, application programming interface (A.P.I.), web servers, cloud distributed network, remote terminal unit, remote telemetry unit, remote tele-control unit, distributed control system (D.C.S.), nodes, module(s), bandwidth, network bandwidth, data bandwidth, digital bandwidth, Supervisory control and data acquisition (SCADA), master system, master data base, information system(s), Bridging (network, computer networks/interface(s), computer cluster, grid computer, super computer, quantum computing, "quant" computer, VIOP/telephone(s), servers, crossover cable, antennae (line of site and omni-directional, radio transceiver(s), optical wireless communications (OWC), OWC Ultra-short range, OWC short range, OWC medium range, OWC Long range, OWC Ultra-long range, Radio waves to mechanical vibration/oscillations to optical conversions/vise-versa/radio frequency over fiber (RFoF), light modulated by a radio frequency signal and transmitter over fiber optic link/cable, Intermediate frequency (IF-over fiber) (lower radio freq.), Fiber to the antenna (FTTA) an optical to electrical (O/E) converter, Satellite Communications on L-Band frequency range, Satellite Communications on Ka band, fiber optic amplifier(s), sectorized antenna, omni-directional antenna/system/processor(s)/controller(s) networks/data transmission network(s), internet, either-net, extranet, wide area networks, local area networks, wired networks, wireless network(s), optical networks, coaxial/(RF-coaxial) networks, buss network, network cable(s), fiber optic cable(s), satellite radio and/or optical/combined, network(s), radio network, radio/optical networks combined, cellular network(s) (2G, 3G, 4G, 5G, 6G, CMDA), TCP/IP protocol networks, WiFi network(s), computer system interface(s), cloud computing, operating system(s), Module(s), distributed control system(s), remote terminal unit(s), fire detection system(s), motion system(s), gas detection system(s), explosion detection system(s), vehicle lock-out(s), compressed/liquefied gas fueling/transfer system(s)/apparatus: (pumps, exchangers, evaporators, compressors, valves (various styles/specifications), controllers, Gas Combustion units, flares, knock-out/surge drum, vacuum pump(s), instrumentation, power supplies, tank(s), pipe, fittings, hoses, connectors, flow-meter(s), insulation (vacuum jacket) system(s), vehicle release system(s), fueling/transfer line(s) release system(s), seismic detection system(s)/sensor(s).

The fueling/transfer systems may utilize/be configured to utilize multiple different programs/learned programs, such as evolutionary algorithms, algorithms, differential evolution, automated planning and scheduling, automated reasoning, automation, speech recognition, speaker recognition, image processing, intelligent word recognition, object recognition, optical mark recognition, silent speech interface, Hybrid intelligence system(s), intelligent agent, intelligent control data mining, process mining, information extraction, image recognition, image retrieval, deep learning, are all facets of artificial intelligence (A.I.) or synthetic Intelligence.

The use of Artificial Intelligence for repetitive motions performed for a Natural Gas Chemical Family/Hydrogen/Propane/ethane/ammonia Vehicle fueling events are within the scope of this invention, such as, automated planning and scheduling, automated reasoning, automation, speech recognition, speaker recognition, image processing, intelligent word recognition, object recognition, photodiode/photodiode array, fiber optic imaging/High speed camera, high speed imagery, Hybrids, I.R., artificial vision, LIDAR, acoustical/ultrasonic mark/recognition, optical mark recognition, silent speech interface, Hybrid intelligence system(s), intelligent agent, intelligent control data mining, process mining, information extraction, image recognition, image retrieval, deep learning, which includes location positioning/3-dimensional positioning, mapping, GPS/Cellular Positioning systems, tank positioning, mooring, tether line/tethering, LVDT/rotary encoder detecting for mooring, anchoring, docking, parking, positioning, elevation, depth, distances, movements, motions, of vehicle (weather wheeled, tracked, Barge (mechanized), ship, spacecraft, aircraft, or rocket). Also included are repetitive motions for fueling connections, weather it be the coupler, rotating coupler, coupler locking mechanism, articulating arm, rotating arm, extension, rotating extension, connector, rotating connector, sliding arm/connector, rotating sliding arm/connection, bridge, articulating bridge, with sliding or rotating base/tank/manifold elevation. Artificial Intelligence capabilities will insure safe Natural Gas chemical family vehicle/tank positions/elevations, and/or hydrogen/propane/ethane/ammonia connections to repeat with safe accurate transfers each and every fueling event. Sensors such as magnetic, optical, and ultrasonic will provide inputs, outputs, and feedback signals for the processor/s to compute locations/positions of the fueling tank(s)/connector(s) via networked data transmission(s). Signals such as Torque, strain/gage, force, light (visible or non visible)(OWC)—Optical wireless communications, and communicate these inputs by wire, bus duct, wirelessly, via radio and/or light/fiber optic/coax/cable/coax R.F. cable/RFoF and/or any combination there-of to/from processor/s/system network. The processor(s) will respond from input(s), (learning) intelligently, utilizing A.I. retrieval/recognition (Images) to respond with signal(s) and outputs which will automatically function as learned/programmed to provide safe fueling connection(s) with vehicle; or not, and provide feedback signals for further information processing. Such as informing operations: "Proper Connection Successfully Made" or "Failure due to A, B, or C error"; of which further action may be necessary by human interface, such as manual (human) assist with a joystick/controller/perihpal device.

Vehicle lock-out is any means/method to disable the vehicle from movement/motion during fueling/transfer event. This includes, transmission/ignition/mooring/parking/docking devices, including A.I. input(s) and/or positioning (GPS/Cellular positioning)/motion detection by optical and/or ultrasonic sensor(s) standing alone and/or combined or simply accelerometer(s)/tri-axial accelerometer(s) coupled to processor(s) to computer motion, or by radio/light/mechanical/electrical device such as tether to switch/series circuit detection device. The system may be activated manually/automatically once a vehicle is positioned and/or any optical, magnetic, ultrasonic sensor(s); some may indicate vehicle position and/or compartment/lid/door/connection to fueling/transfer system is detected, and/or simply by operator input.

To detect omni-directional vehicular movement/distances/motion(s), multiple sensor(s) may be utilized to perform different functions, standing alone and/or in a cascading control system to perform a fueling/transfer lock-out (and/or release) and/or automatic fueling/transfer line release/disconnect/vehicle lock-out release. The use of one or more micro-switches, combine to automatically mitigate excess movement/motion(s) by initiation of fueling/transfer(s) lock-out system, closing isolation valves (or diverting flow, with vehicle(s) flow isolated) to prevent/disable fuel flow/transfer(s). The use of one or more sensor(s) such as optical and/or ultrasonic that detect motion/movement/excessive motion/movement (above or greater than predetermined stop limit(s), can be sensor(s) such as laser and/or radar measurement sensor(s) and/or accelerometer(s)/tri-axial accelerometer(s) coupled to processing units to compute motion(s), and/or inertial motion unit(s)/simply gyro(s)—(optical/magnetic/ultrasonic)/MEMS device(s)/mechanical gyro(s). The use of one or more of these sensor(s), or possibly multiple sensor(s) creates the safest condition to stop/mitigate fuel/transfer(s), by maintaining other systems in a lock-out state, and activating audible/visual alarms. The fuel flow system may be re-activated by an operator, if proper operational conditions have been met. Different vehicles may require different parameters to initiate such motion and/or fueling/transfer system lock-outs. Such as, for example; a barge, that has a surge tank, with variable tank elevation/elevator(s), which raises and lowers tank (for bridge clearance(s)/the benefit of head space vapor push with gravity assist), may require additional motion detection at the surge tank level; the surge tank level (elevation) is variable, and thus, when fueling/transferring has liquid level inside tank, (subject to internal sloshing), thus when tank is elevated, it will be subjected to amplified motion(s) of pitch, roll, and yaw. Motion detector(s), are paramount for safety, the vehicle/vessel/barge may become unstable with an elevated surge tank with compressed/liquefied gas with-in; and thus, predetermined stop limits, of motion (all axis's) beyond which, will signal/relay/trigger fueling/transfer shut-down and/or fuel/transfer line system release, so that tank may be lowered/automatically lowered for over-all system safety (lower center of gravity) until conditions improve/cease. Sensor(s), which detect tank elevation, such as magnetic, optical, and ultrasonic, can detect tank elevations, and may additionally detect when surge tank is in "Home"/ground "base" position, and further devices may detect if a locking (automatic) mechanism (optional), utilized to secure surge tank to deck, is activated/de-activated. Also, optionally the surge tank elevator(s) may operate independently (separate from the pilot house) and be elevated/lowered; and in this case a distinct transmission lock-out shall be provided, such that the vehicle is rendered incapable of moving by it's own power while surge tank is elevated/raised off "Home"/base. Motion(s)/elevator(s) operation/detection device(s) shall communicate signal(s) by wire/wirelessly by radio/light/OWC/RFoF and/or any combination of wire, (coax/coax R.F.)/wirelessly, by radio/light, for the network communications/signal(s) with processor(s) detection system/microcontroller/processor/locally or remote system(s).

Fueling/transfer(s) system lock-out(s), is any means or techniques to prevent/stop/mitigate a fueling/transfer event. Several sensor(s)/system(s) have the ability/input/output and capability to stop fueling/transfer(s). Multiple system(s), to mitigate fueling/transfer(s), is by Process Shut-down/Stop, button device(s); (optional color: yellow/red mushroom button) device, to close/(divert) the flow path with isolation valve(s)/stop pump(s)/compressor(s)/and/or in some systems designed to isolate vehicle(s) and to re-direct flow by (3-way; 4-way, or multi-port valve(s), to one of ordinary skill in the art will realize other input(s)/output(s) to create a safe fueling/transfer lock-out, which will be indicated by audible and or visual, both on the Human Interface and in transfer zone to alert all, of a fueling/transfer lock-out, which may, in certain situations, be re-established by an operator (re-set/re-start) after situation is corrected. Visual alerts include, Human Interface screen (computer monitor(s) and/or touch screen(s) banners of flashing yellow, red, xenon; or intrinsically safe light/strobe of yellow, red, or xenon. The fueling/transfer system lock-out(s) sensor(s)/system(s) may communicate signal(s) by wire/wirelessly by radio/light/OWC/RFoF and/or any combination of wire, (coax/coax R.F.)/RFoF/wirelessly, by radio/light, for the network communications/signal(s) with processor(s) detection system/microcontroller/processor/locally or remote system(s).

The system(s)' power supply shall be reliable and robust, safest will be two (2) separate power sources/feeds, redundant feeds will decrease power outage, and associated problems. Automatic transfer switching to be provided, to enhance reliability. Individual transformers, and uninterrupted power supplies (UPS) with battery back-up will also enhance system operations. Seamless transfer of power is crucial for liquefied/compressed gas fueling/transfer systems safety.

Land based fueling/transfer system(s) shall include Seismic system(s) for safety shut-down(s) in the event of predetermined seismic/motion set-point(s) achieved. Such motion, as an earth-quake/tectonic shifting. A Seismic survey, conducted in advance of site selection will identify zone(s) or areas which may be more prone to Seismic activity. The use of multiple accelerometer(s)/tri-axial accelerometer(s) coupled to processor(s)/inertial motion units, also other sensor(s) such as ultrasonic and/or optical devices, standing alone or combined, strategically located will enhance detection of Seismic events. These Seismic sensor(s)/systems will actively communicate with the network(s) of processor(s) and shall communicate/activate events by wired/wirelessly/by radio/light/OWC/RFoF and/or any combination of wire (coax/coax R.F.)/wirelessly by radio/light/OWC. Also, any Tsunami warnings/alert(s)/indications shall result in an immediate shut-down of fueling/transfer event, including transfer line(s) release, system purge, lowering of surge tank to "Home" base and secured; a complete wrap-up and stow; readied for departure to safe harbor.

Voice activated commands/controls (VAC), along with voice recognition/identification for intelligent system operations is with-in the scope of this invention. Utilizing A.I., VAC, will enable operations/systems to react rapidly when problems arise. Voice translators/speech/intelligent word recognition programs to flow chart/Deep learn/program responses to react by automated reasoning; efficiently, generally quicker than human reactions, to respond; A practiced/learned VAC of "FIRE"; will automatically understand, and activate the cascade of controls/systems to: stop fueling/transfers flows/pump(s)/compressor(s)/close/Isolate all valves for flow(s)/release fueling/transfer lines from vehicle; release vehicle lock-out(s); Liberate vehicle for operator control (movement); simultaneously starting fire pump(s)/fire suppression system(s)/relay-dispatch-auto dialer to fire department for assistance. Utilizing hearing/speech recognition, by head sets, along with Hybrid/A.I. intelligent systems, can speed reaction time, thus possibly saving lives and/or preventing further problems/damages. VAC can also be utilized for human interface/manual override to assist with fueling/transfer system connection; for example: "lower connection", "extend connection", "Clamp Connection" when optical/magnetic/ultrasonic target recognition is satisfied. Many functions can be "Machine Learned/Deep-learning" by image processing and/or data mining and/or object recognition, for operator assist and or fire safety. A.I. systems will improve and save lives and assets.

Monitoring/remote monitoring of compressed gas/liquefied gas transfer(s)/fueling events is useful for training/event review(s). Multiple monitor(s)/split screens (quad screens)/remote monitoring systems enable others with commercial interest to monitor actions. Camera(s), video/still, may be strategically located to record both visual and audio events. Camera(s) with night vision (I.R.) may also be utilized, for added security. Camera(s) may communicate by wire/wirelessly by radio/light and/or any combination of wire (coax/coax R.F.)/RFoF/wirelessly by radio/light/OWC. Camera system(s) will aid operations, as viewing/monitoring of system(s) previously unseen will provide "eye's" for human and/or asset protection.

Bio-metric identification, another form of Artificial Intelligence, may be utilized to authenticate individuals operating/re-setting fueling/transfer events. Unique Iris/facial/finger prints/recognition scanners may be optical/ultrasonic/magnetic any and/or any combination of. All personnel, will individually log onto computerized transfer system(s) to perform operations/manipulations of system(s)/resets, identifying each action by individual/speech recognition via VAC. These security features will ensure properly qualified operators are controlling fueling/transfers, and that only authorized individuals have access to system(s).

The HOST-Supplier tank, which can also be one of multiple "HOST-Supplier" tanks, which may include liquid/vapor manifolds for separate supply/receiving configurations, also the HOST TANK(S) can receive it's supply from another type "C" pressurized source, or it can receive compressed liquefied gas from an "atmospheric" tank(s). The compressed/liquefied gas source can be local, from a near-by plant, or it can receive via trucks/rail/barge/ship/tanker, also there may be an optional "Load Cell"/Weight station at the location for transfer measurements.

The advantages of this system is that it can be assembled in a relatively small footprint, and it greatly reduces vapor phasing, many times vapor phasing originates from pump(s)/it is the heat of compression/centrifugal/kinetic energy force that releases the composition, to change back to it's gaseous state, and this results in too much vapor-phasing, and thus is extremely difficult to measure/transfer. The vertical/horizontal surge tank, provides for gas/liquid separation, and pressurized/gravity feed provides liquid measurement/transfer/fueling to receiver tank(s), which very beneficial to both parties.

Also included with-in the system is a liquid nitrogen tank, evaporator, and distribution system to provide both liquid and vaporized nitrogen to "Vapor Displacement" transfer system. The liquid LN2 is useful for system cool-down at start-up; as stated it drops system temperature, in advance of refrigerated liquefied gas introduction, thus reducing vapor phasing of product. Vaporized nitrogen is utilized for post transfer/fueling event to inert the system.

Oxygen content detection system(s) with separate power sources, measures 02 level in HOST tank, any supply tank(s)/any receiving tank(s) and/or transfer system. The sensor(s) can be electro-chemical detector/paramagnetic with magnetic/optical detection sensor(s), system(s) shall enable/trigger/relay/signal on predetermined measure of oxygen (enriched/deficient) with-in fueling/transfers system a shut-down. The oxygen sensor(s)/system(s) may communicate signal(s) by wire/wirelessly by radio/light/and/or any combination of wire (coax/coax R.F.)/RFoF//wirelessly by radio/light/OWC, for network communications/signal(s) with central detection system/microcontroller/processor(s)/processor/locally or remote system.

Parallel, (2), isolated/separate hydraulic system(s) with accumulator(s), plus High/low pressure sensor(s), with separate power source(s), failure shall trigger/relay/signal a fueling/transfer system lock-out, the pressure sensor(s)/system(s) may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally or remote.

Any arc, lightening, spark, static electric, or arcing of any kind in the transfer zone shall initiate a system Emergency STOP—SHUTDOWN. This condition is not acceptable in the transfer zone. An optical system capable of arc detection; even low energy arcing, will trigger/relay a signal that arcing/lightening is present and trigger an E-Stop-Shutdown event, and idle the transfer system until situation is either corrected, or weather improves.

Static electric arcing also a valid danger for compressed gas/liquefied gas fueling/transfer(s), proper grounding system(s), with indications and/or interlocks will afford additional layer safety, by indication of non-grounding. A ground monitoring system that is interlocked with shut-down system, to verify proper ground(s) are functioning, is with-in this invention to ensure safety, system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally or remote.

A vacuum system, which evacuates the transfer lines is also an option. This will evacuate the system of any residual liquid/gas/vapor, and transfer the gas to the Gas Combustion Unit/Thermal Oxidizer for proper disposal. The now negative pressure system, which can also indicate any system leaks, by negative pressure infiltration, is ready for nitrogen gas "Blanketing"; thus keeping an "oxygen free" system, ready for next cool-down cycle, system(s) may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally or remote.

A vacuum monitoring system, consisting of compound gauges (vacuum/positive pressure), will be for type "C" tanks with sealed jacket/vacuum insulated metal jacket. This will provide signal for indication of a tank/jacket leak, this signal, relay, trigger an alarm for further review by operations.

Gas leak detection systems are mandatory for compressed/liquefied gas fueling/transfer(s). Multiple methods and techniques are available. Electrochemical/optical/catalytic bead/heated wire methods can acquire sample by passive or pumped methods. Such as point detection, which can use local/remote cells (sample gas may be pumped to remote panel/cabinet) or passively collected for gas detection. Another type is referred to as "Open Path" method, a strategically placed optical path passes a light beam between transmitter and a receiver, the light differential is calculated into a "Gas level %" base on which gas is being measured. This is good for measuring across a distance. The best coverage is to utilize one or more methods, standing alone and/or combined to provide robust gas detection system coverage. The system(s) may communicate signal(s) by wire/wirelessly by radio/light/OWC/RFoF and/or any combination of wire, (coax/coax R.F.)/wirelessly, by radio/light, for the network communications/signal(s) with processor(s) detection system/microcontroller/processor/locally or remote system(s).

Isolation Valves:

Proper isolation valve design, lay-out, and installation is paramount to a safe fueling/transfer system. There are many different styles, combinations, and applications for different types of Isolation valves. Many isolation valves are control valves, some are manual, some are control valves with manual override, some are self-regulating. There are many different control valve operators, such as air operated, spring operated, electric operated, temperature operated, hydraulic operated, and pressure operated, to name a few. These operators can be configured in many different ways, such as; air to open, air to close, fail to open, fail to closed, spring pressure to open, spring pressure to close, reversing contactors/relays to open/close; different hydraulic/pressure(s), Hydraulic power to open/Hydraulic power to close/multiple pressure regulators, (spring/weights) set points for self/pilot/ internal D/P regulation//relief/lifting, to name a few.

There are also different valve port isolation and flow arrangements; for many different applications, such as 2-way, 3-way, and 4-way, reversing valve(s) and multi-port valves. These are utilized in system specific lay-outs; such as a recycle system, looping, diverting, and by-passing applications along with two, three, four, or multi-ports utilized for isolating/recirculating flow. A liquefied/compressed/gas fueling/transfer system can benefit from certain valve design lay-outs. Such as utilization of a recycle/diverting/by-pass/ multi-port/Isolation valve(s) in the supplier/receiver/liquid/ vapor line(s) outside the "interface/between" line(s). In one concept, avoiding line pressure surge by diverting the gas/ Liquefied gas to one of several optional routes, while isolation to supplier/receiver is obtained. The diverted/by-passed/re-cycled/looped flow may be to a recycle line, a surge or knock-out drum, a gas combustion unit, or if there is an onboard evaporator, the flow may be diverted to evaporators' fuel feed line for vehicle consumption. PRV=Relief/Reducing/Regulating: multiple names; different applications, same initials (P.R.V).

Pressure relief valves (PRV's) and/or Pressure regulating valves (PRV's), may also be categorized as ISOLATION Valve(s), Pressure Relief valves can be operated by pressure, temperature, or both. For example, millions of homes in North America have hot water heaters (electric or gas), but they all have a Temperature/pressure relief isolation valve, keeping the water in the tank, and only "relieving" when another system malfunction has occurred, such as high water pressure/high water temperature/both; It is at this time that the "Relief Valve" activates and isolation ceases, and water is "relieved" onto floor/drain to save the water heater tank from possible rupture. The P.R.V. will passively protect the water tank/house/business for long periods of time, only activating when excess temperature/pressure/both exist. Another type of P.R.V. is the pressure regulating valve, which is also an isolation valve that has many different applications. It can be controlled by system pressure using a "Pilot Valve/line" or "Internal Pressure Differential", or a P.L.C. program. These pressure regulating valves also act as isolation valves, as they are also one direction for flow. For example, if you have two (2) Isolating valves closed with a cryogenic liquid locked between them; the system shall require some form of "Pressure Relief/Regulation" due to naturally occurring thermal expansion between the (2) isolation valves. A Pressure Regulating Valve, with a pilot regulator/internal differential pressure (D.P.) regulating isolation valve can sense a higher than normal internal pressure (in this example the cryogenic material between (2) isolation valves), activate itself, thus breaking the isolation it normally provided and reduce the pressure created by naturally occurring thermal expansion, this Pressure regulating valve will continue to operate until pressure created by thermal expansion no longer exceeds its operating/activating pressure set point/until system is back to normal operating conditions and the cryogenic media stops pressure build-up/ other/all media is removed from the system, or simply a pressure relief valve for hydraulic liquid lock-in between valves. Relief/regulation shall be piped to knock-out drum for further safe processing.

Some valves can have the same initials, such as P.R.V.; perform similar isolation duties, but have different activating mechanisms (springs/weights versus differential pressure/ pilot valve/line pressure) and different names (Pressure Relief Valve vs. Pressure Reducing Valve vs. Pressure regulating valve) plus various material/internal composition(s).

All of the fueling/transfer(s) System valves/2-way/3-way/ 4-way/multi-port valve, reversing, recycling valve(s) will have Independent Positive Position Feedback Positioners/ P.P.F.B. The P.P.F.B., is an independent/separate signal to/from a PLC/DCS/processor(s)' valve(s)' output supplied signal, which relays back the indicated valve position. The control system shall include a program to compare valve(s) output signal(s) to the P.P.F.B. signal(s) to verify a corresponding value. This redundant verification of the corresponding signals, provides positive proof of valve position/ port location/not thus, reduces manageable risk to a greater acceptable level, thus increasing operational fueling/ transfer(s) safety by orders of magnitude, system(s) may communicate signal(s) by wire/wirelessly by radio/light/ and/or any combination of wire (coax/coax R.F)/RFoF/ wirelessly by radio/light/OWC, for network communications/signal(s) with central detection system/ microcontroller/processor/locally or remote.

As one can understand, there are many multiple Isolation valve combinations for a fueling/transfer/gas system of supplier side/receiver side. A line diagram/schematic will demonstrate several arrangements, to show multiple connecting(s) of Isolation valve(s) plus orientations/designs, attached to this application; FIGS. 1-5; the diagram displays few of the vast valve configurations possible for vapor displacement transfer system, with a pump (operated by level control of surge tank) to aid for high flow transfer(s).

The following is a multiple step by step; valve number to valve number, flow paths, using the basic flow schematic attached to make a general description of the compressed/ liquefied gas flows:

Supplier (HOST Tank "A") Tank to Vehicle/Barge/Ship/ Tanker (receiver) Tank (no pump):

System cool-down completed; compressor is started-discharge vapor flow from receiver tank thru #42-thru #44-thru #24-thru-#35-thru-#34 thru-#33 thru-#22 thru-#27-thru- #28-thru #13-thru #1-into "HOST "A" Supplier" tank for pressurization; Liquid flow from "HOST "A" Supplier" tank flow #2-thru-#11-thru #15-thru #25-thru-#26-thru #21-thru #43-thru #41 liquid flow into Barge/Ship/Tanker "Receiver" Tank.

In case of a shut-down: compressor is stopped, Valves #41, 42, 33, 34, 35 are Closed; #36, #23 are opened; and #24 diverts ports (isolation of receiving tank); #15, #25, #26, #2 will remain open for gravity liquid drain back to Host "A" supplier tank; #21 is diverted, the flow to Barge/Ship/Tanker receiving tank is isolated, and the flow is diverted to HOST "A" supply tank thru #2; after level indicator for Surge tank indicates empty (no Liquid level) and CMF indicates zero flow the #2 HOST "A" supply tank valve is closed/isolated.

There are two (2) compressor re-cycle paths with-in this system. First is the valve #36, upon over pressure or other upset valve #36 will open and gas path will begin looping, therefore no longer providing differential pressure to system. Another gas path re-cycle loop, can be identified as passing thru #33 thru #22 thru #23 thru #24 thru #35 thru #34 and looping; thus no longer providing differential pressure to system, an operator will identify cause of looping, any may re-set when proper conditions are achieved.

A pump(s), may be utilized to transfer liquid from HOST TANK "A" up to Surge tank; the pump(s) may be variable speed, and will be controlled by level indicator/controller from surge tank level, this may assist with Higher flow/fast filling applications.

Components such as "Vee-Ball" control valves, duel pressure xmtrs, and duel temperature xmtrs both up and down stream of CMF devices, to provide exact back-pressure, to keep product from vapor-phasing. A micro-controller, configured for bi-directional flow, will utilize inputs such as temperature(s), pressure(s), density(s), to produce a computed flow, and provide proper back pressure to limit vapor phasing of product.

The attached schematic(s) display only the concept(s), they not a blue-print(s), many different versions, with different valve(s)/option(s)/tank(s)/compressor(s)/(optional) pump(s), piping arrangements/designs are with-in the scope of this invention. Many re-arrangements of components, utilizing different number(s), or number of valves/types, locations of compressor(s), Tanks, valves, all to achieve vapor headspace push of compressed/liquefied gas fueling/transfer(s) is with-in the scope of this invention. Such as an optional tank "Boot"; also some tanks have bottom connections (holding tanks in drawing have NO bottom connections, for safety). May contain more than one HOST Tank (supply or receiving tank(s) A, B, C, D . . . ). The innovative process of Vapor head space displacement/pressurization for transfer(s) of liquefied gaseous products, such as; natural gas, propane, hydrogen, ethane, ammonia liquefied gases, is with-in the scope of this invention.

In this invention, the fueling/transfer system apparatus utilizes head space vapor push method, for Type "C" Pressurized tank(s), which is beneficial for fuel(s) that have vapor phasing qualities, this system reduces vapor phasing and makes handling and fuel flow measurement less challenging. The HOST supplier tank, the receiver tank, and the surge tank between them, plus a plethora of control valves, including 2-way/3-way/P.R.V.'s, and control valve(s) strategically placed will allow Bi-Directional Fueling/Transfer(s), and measurements. The fueling/transfer flow(s) is generally from HOST supplier system/tank(s) to vehicle(s), although from time to time the vehicle tank requires evacuation, or possibly a large quantity feeder to the supplier tank(s), such as bulk-break supplies to the supplier; therefore this system version, has capabilities to flow/supply/feed from vehicle/barge/ship/truck/or plant to feed into HOST-"supplier" tank(s). Strategically placed valve(s) will allow Bi-Directional transfer(s) utilizing compressed gas (the gaseous state of which ever chemical composition of fuel is being transferred), pressurizing (pushing) on feeding Type "C" tank head-space, and compressor suction from receiving tank; the surge tank provides vertical/horizontal liquid/gas separation and elevation provides for gravity assist, for pressurizing/pushing during fueling/transfer event, and to drain surge tank. This version of the transfer system will be 100% contained, and safeties in place to relieve system in the event of an upset. Multiple, strategically located pressure relief valves, will provide pressure relief, when needed, and pass the higher liquid/vapor pressure to a knock-out drum/Gas combustion/Thermal Oxidizer unit for proper disposal.

If fueling/transfer system is onboard a vehicle/vessel/barge/ship the HOST Tank can be optional, and the surge tank may be utilized as Host supply tank with filling from an atmospheric onboard tank, below deck/Type "C" (above/below deck). In this version, of the invention, the surge tank combines with features of the supply tank; such as level controller operating the (optional variable speed drive) pumped liquefied gas supply from atmospheric/"C" tank below into the surge tank. Another innovative feature; is that the Type"C" tank can be hydraulically/mechanically/electrically elevated onboard, and locked into an elevated position, during fueling/transfer event. This feature is also advantageous for multiple geographies, transport(s) with lower bridges, and lower elevation clearances, will require any on-board apparatus to allow for clearance, automatic clearance monitoring of bridge/river level fluctuations is crucial. Combining vapor-head space pressure with gravity assist, will enhance fueling/transfer(s), and by lowering tank back to deck level after fueling/transfer event, and securely re-locking onto deck/below deck prior to vessel movement. Hydraulic/mechanical/electrical/any combination of the three; raising/elevating the tank(s), may be from deck level or below, and can be automatically monitored by rotary encoder/optical/ultrasonic/magnetic technology sensing. To an elevation necessary, to utilize vapor head-space push, with-out vaporizing the liquid during the transfer/fueling event; surge tank outlet elevation shall vary according to receiver tank manifold elevation. The raising and lowering of the surge tank (empty during raising/lowering; exemption of an emergency) can be possible by rated flexible approved hoses strategically attached by either draping on deck and/or un-coiled/rolled/distributed/re-rolled onto hose(s) multiple reels. This allows proper flow(s) of vapor(s) and/or liquefied gas(s) from variable elevation(s) of surge tank, and all liquefied/compressed gas(s) are safely contained. The tank variable elevation system, will change the center of vessel/vehicle gravity. Elevated structure/tank motions will be enhanced, and liquid(s) will slosh; this shall require review/approval of regulatory authorities. This elevated surge tank system may require a re-liquefier to accept fueling/transfer(s) from a pressurized source to an atmospheric tank, but atmospheric tank to atmospheric tank transfer/fueling is possible. Also, optionally, if the Pilot house is hydraulically/mechanically/electrically raised and lowered; the surge tank may be supported by/on the same, hydraulic/mechanical/electric or any combination of the three hoisting system(s). Keeping tank elevation just below peak of pilot house clearance, and utilizing pilot house ultrasonic/radar/optical/lidar clearance/crash avoidance systems to maintain proper bridge clearance for both pilot house and tank/fueling/transfer system is with-in the scope of this invention, plus all communications system(s) may communicate signal(s) by wire/wirelessly by radio/light/and/or any combination of wire (coax/coax R.F)/RFoF//wirelessly by radio/light/OWC, for network communications/signal(s) with central detection system/microcontroller/processor/locally or remote.

Fire and/or explosion(s) of any type during fueling/transfer(s) is also a danger signal that all fueling/transfer(s) shall cease operation. To detect hazardous fire conditions, the use of one or more sensor(s) standing alone or combined, in combination with one or more micro-switches, can combine to automatically initiate the fueling/transfer system lock-out, to prevent/stop fueling/transfer pumps, compressor(s), close (isolate) fuel flow valves, and activate fire alarms, fire pumps/suppression systems, and relay fire condition to fire department. Sensor(s) such as optical or magnetic can detect infrared, ultraviolet, heat, rate of rise in temperature. Any fire/flame scanner or laser sensor(s), fusible/friable links standing alone system(s) may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally or remote, or combined are all with-in the scope of this invention. Such devices/system(s) can detect and activate fire alarms.

To prevent enhancement of further fire or explosion hazards, an optional relay or digital or analog logic function/micro-switch(s)/relay, that is activated by a fire detection system or explosion detection system/device(s) to provide/ produce a signal/trigger/relay to enable/release fueling/transfer line release system and/or vehicle lock-out release system; thus liberating the vehicle for operator control, to remove itself from fire source, or away to distance itself from further spreading fire or explosions, weather another vehicle is present or fueling/transfers are taking place from a fixed storage vessel/tank. Optical sensor(s) such as infrared/ultraviolet individually and/or combined can sense heat/fire, also sensor(s) such as rate of rise in temperature and ionization can detect excessive temperature and smoke. Fusible/friable links plus other sensor(s) such as acoustical/ultrasonic/infrasonic system(s)/receiver(s) can detect loud sudden noises/waves (sound/pressure) such as those created by a rapid expansion of molecules in a confined environment, /or explosion(s). Any sensor activation will initiate the fueling/transfer lock-out system, plus activate/de-activate the fuel/transfer line release system, plus activate/deactivate the vehicle lock-out to liberate the vehicle for operator control of the vehicle(s). All of the sensor(s)/processor(s)/system(s) may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally or remote.

All motion and/or fire/heat sensor(s) are generally coupled to a processor. The processor executes stored instructions from memory, and makes decisions using artificial intelligence techniques to determine a course of action, as stated, the action might be just a fueling/transfer(s) shut-down or it might be a complete disconnect of the fueling/transfer system from the vehicle, and vehicle lock-out release; liberating the vehicle for operator control. The sensor(s)/and/or processor(s) may be part of the fueling/transfer supply system apparatus or they can be on the vehicle/vessel or both, system(s) may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally or remote.

The use of optical sensor(s) such as infrared temperature or fiber optic sensor(s) to detect presence or absence of a liquefied cryogenic temperature/temperature differential, which can determine the presence or absence in fueling/transfer lines, and thus a relay or digital or analog logic function/signal/combined to produce a vehicle lock-out. These can also be flow switches/flow meter(s) with transmitters which can communicate with system(s)/may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally or remote.

The use of magnetic sensor(s); such as magnetometer(s), Coreolis flow meters, (u-tube), density meter(s), linear variable differential transformers (LVDT), strain gauges, or mass flow (temperature/pressure compensated flow) plus other methods of detecting flow are with-in the scope of this invention. The listed sensor(s) sense the presence of a liquefied gas/connection between a fueling/transfer system and a vehicle. These sensor(s), standing alone/combined produce a signal/relay, analog or digital, or logic function to produce a signal for operation of safe vehicle fueling/transfer. Magnetic sensor(s) can detect the presence of a liquefied gas hose in proximity to tank fill adapter/valve/fitting. All of the sensor(s) may have transmitters that communicate with system(s)/may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally or remote.

The use of ultrasonic sensor(s) such as flow meter(s), which can be an external type that clamps-on or monitors from exterior of flow line or it can measure flow internally (submersed) is also with-in the scope of this invention. Also, any other method that utilizes ultrasonic/radar/or other waves for detection are with-in the scope of this invention. Such as guided wire radar (radar on a cable/rope), this method is for tank level measurements, it can also detect multiple liquid levels, for phase differential detection, very good for liquefied gas tank level measurements. Ultrasonic sensor(s) sense the presence of a liquefied gas hose in proximity to a tank fill adaptor/valve/fitting. Ultrasonic sensor(s) may sense/guide manual/automatic/semi-automatic fueling/transfer system(s) to sense proximity; or that a particular mechanical part is/is not in a particular position; such as a fueling/transfer rack, tray, arm, hose, articulation, extension of hose-line, coupler, locking coupler, rotating coupler, travel/slew(ing), or fueling/transfer devices/connections. All of the sensor(s) may have xmtrs that communicate with system(s)/may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally or remote.

The use of optical sensor(s), such as infrared, ultraviolet, laser, fiber optic, visible/non visible light to detect the presence of a liquefied gas fill hose in proximity to a tank fill adapter/fitting/valve is with-in the scope of the present invention. The sensor(s) can measure interference of a light beam, obstruction, light differential, existence or non existence, proximity, and weather a mechanical part is/is not in a particular position, such as a fueling/transfer rack, tray, arm, hose, articulation, extension of hose-line, coupler, locking coupler, rotating coupler, travel/slew(ing), or fueling/transfer devices/connections. All of the sensor(s) may have transmitters that communicate with system(s)/may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally or remote.

The system contains many different flow paths/tank(s)/piping arrangements, therefore any/all temperature/pressure/flow measurement devices used to sense, and/or control the liquefied gas fueling/transfer(s) by vapor displacement are with-in the scope of this invention. All of the sensor(s) may have transmitters that communicate with system(s)/may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally or remote.

Vehicle/Vessel mooring system(s) may also be incorporated, in whole or part, for detection of motion/excessive motion. Sensor(s) such as optical, magnetic, and ultrasonic standing alone/and/or any combination of sensor(s) may be utilized. Sensor(s) such as linear variable differential transformers (LVDT)/Strain gauges/rotary encoder(s)/torsion/torque/gauging are all with-in the scope of this invention. These system(s) may also utilize A.I. system(s), such as A.I. vision/photodiode/arrays/phototransistor/arrays/High speed camera(s)/fiber optic imagery/Hybrids/Fiber optic Sensor(s)/high speed imagery; sensor(s) may be utilized to detect movement/motion of mooring systems beyond a predetermined set-point. These mooring system(s) may also be part of the vehicle release system (triggered by fire/explosion/highly excessive motion event (which is detected by omni-directional motion sensor(s); (optical/ultrasonic/magnetic motion devices). System(s)/devices may utilize communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

Also, all the safety systems, operator's, sensor(s), relays, controller(s), micro-controller(s) triggers, micro-switches, over-rides, lock-outs, reset(s), video's, and events shall be continuously recorded, all logic/data will be Identified and have current date and time stamps recorded. Data, events, video's, and all records will be available for viewing/print out, locally or remotely. Data can be transmitted by wire/wirelessly by radio/light and/or any combination of the three, and can be transmitted via private/leased network(s) for cyber-security, or it may be transmitted TCP/IP, or intranet/extranet, or satellite network/with back-routing capability.

The following is a list of system components:
The supplier HOST tank is a Type"C", pressure vessel with strategically located liquid transfer (optional dip tube(s)).
The receiver tank is a Type "C", pressure vessel with strategically located liquid transfer (optional dip tube(s)).
The Surge Tank is a Type"C", pressure vessel with strategically located liquid transfer (optional dip tube(s)).
Compressor(s), for vapor head space pressure pumping; may use one or more compressor(s) (optional VFD)
Pump(s), for liquefied gas transfer from HOST supply tank(s) to surge drum (optional VFD)
Knock-out/Flare Drum (vessel), for system relief, to the Gas Combustion Unit(s)/T.O./Flare
Vacuum pump system (optional) to evacuate system; into Knock-out drum Nitrogen Tank (LN2) for cool-down/purge system(s)/inerting
De-Mister/Compressor Suction accumulator Tank.
Gas Combustion Unit
Flare
Thermal Oxidizer
Inerting System/Cool Down/Purge System by Liquid Nitrogen (LN2)
Control System: DC S/Modules/Microcontroller(s)/remote terminal unit(s)/processor(s)/memory
Light/Optical/Fiber optic/radio/wired and/or any combination of the three for communication system
Instrumentation:
  HOST "A"
  Supply Tank: (per Tank) pressure transmitters (xmtr)– compound gauge; vacuum+pressure
    (per tank) Isolation control valve(s) One for each liquid line/vapor line
    (per tank) Level xmtrs
    (per tank) High/High-High Level Floats (optional)
    (per tank) three or more temp. xmtrs (vertically spaced)
    (per tank) three or more analyzer taps (optional)
    (per tank) oxygen detector(s)
    (per tank) insulation jacket vacuum monitoring (optional type "c" with vacuum jacket)
  Receiving Tank: (per tank) pressure xmtr(s)–compound gauge; vacuum+pressure
    (per tank) Isolation control valve(s) (one for each vapor and one for each Liquid line)
    (per tank) Level xmtrs
    (per tank) High-High Level Floats (optional)
    (per Tank) three or more temp xmtrs (vertically spaced)
    (per tank) three or more analyzer taps (optional)
    (per tank) oxygen detector(s)
    (per tank) insulation jacket vacuum monitoring (optional type "C" with vacuum jacket)
  Surge Tank: (per tank) pressure xmtrs–compound gauge; vacuum+pressure
    (per tank) Isolation control valve(s) (one for each vapor and one for each Liquid line)
    (per tank) Level xmtrs
    (per tank) High-High Level Floats (optional)
    (per tank) three or more temp xmtrs (vertically spaced)
    (per tank) oxygen detector(s)
    (per tank) insulation jacket vacuum monitoring (optional Type"C" with vacuum jacket)
  De-Mister Tank: (per tank) pressure xmtrs–compound gauge; vacuum+pressure
    (per tank) isolation control valve(s) (one for vapor and one for Liquid line)
    (per tank) differential pressure xmtrs (optional switches)
    (per tank) level float xmtrs (optional switches)(1-Hi liquid/1-Hi-Hi Liquid level)
    (per tank) one blow-down valve (automatic) plus one manual block valve
    (per tank) one manual blow down valve (2 in-line block valves)
    (per tank) oxygen detector(s)
  Knock-out Tank: (per tank) pressure xmtrs
    (per tank) Isolation control valve(s) (one for vapor and one for Liquid line)
    (per tank) level xmtrs
    (per tank) high-High level floats (optional)
    (per tank) three or more temp xmtrs (vertically spaces)
    (per tank) one blow-down valve (automatic) plus one manual block valve
    (per tank) one manual blow down valve (2 in-line block valves)
    (per tank) oxygen detector(s)
  Compressor: May be centrifugal, reciprocal, screw, rotary, or positive displacement (optional) Variable Frequency Drive
    (per Comp) Low pressure xmtr/Cut-outs (compressor inlet pressure Low/Low-Low)
    (per Comp) High Pressure xmtr/Cut-outs (compressor inlet pressure Hi/Hi-Hi)
    (per Comp) duel reversing valves (for compressor flow reversing)
    (per Comp) Re-cycle valve
  Optional Fuel
  Liquid Pump: (optional) Variable Frequency Drive
    (per pump) pressure xmtrs/L.P.C.O/H.P.C.O.
    (per pump) d/p xmtrs/switches
    (per pump) strainer/filter
    (per pump) (optional) Flow meter
  Optional Spray
  Re-circ. Pump: Internally (tank(s)) Mounted and/or externally mounted.
  Flow Meter(s): Coreolis Bi-Directional flow meters (Magnetic/optical/ultrasonic internal measurement)
    (2) Vee-Ball Valve(s) per CFM (control valves) for Bi-Directional back-pressure regulation.
    (2) Pressure xmtrs/CFM (for Bi-directional mass flow pressure detection/compensation)

(2 Temp. xmtrs/CFM (for Bi-directional mass flow temp detection/compensation)
(Optional) Ultrasonic Bi-Directional Flow meters
Optional Flare/
Thermal Oxidizer
Flow Meter(s): (1) Coreolsis Bi-Directional flow meters (Magnetic/optical/ultrasonic internal measurement)
 (2) Vee-Ball Valve(s) (control valves) for Bi-Directional back-pressure regulation.
 (2) Pressure xmtrs (for Bi-directional mass flow pressure detection/compensation)
 (2) Temp. xmtrs (for Bi-directional mass flow temp detection/compensation)
 (1) Ultrasonic Bi-Directional Flow meters (can be internal/externally mounted for flow det.)
GCU/Flare/T.O.
 Oxidizer: Isolation valve(s) for Thermal Oxidizer/Flare/G, C, U. Isolation pressure regulating valve (to reduce/regulate system pressure inlet to T.O.)
Filter System: Differential pressure xmtr/switch
 Press. xmtrs; compound gauge; pressure+vacuum
 Isolation valve/switch flow for composite duel filter unit.
Internally
Recirculating
 System: Pumps per tank (Supply tank(s) and Receiving Tank(s).
  Spray Bar(s) one/more per Tank(s)/Pump(s) and/or Spray Ball(s).
  Raised Top Flanges Openings with cable/rod+packing gland for changing/pump elevation.
  Eyelets on Top Flange(s) for lifting.
Inerting/LN2
 System: Liquid Nitrogen storage tank(s)
  Level xmtrs (liquid nitrogen volume available)
  Pressure xmtrs (LN2) pressure
  Isolation valves (automatic/Manual)
  Control Valve(s)/metering flow into system
  Optional flow meter (ultrasonic/diff.-Pressure/coreolsis)
The following list of major Control valves by system/components:
Supply Tank: Valve I.D. #1=HOST"A" Tank Vapor Isolation=2-way control valve
 Valve I.D. #2=HOST"A" Tank Liquid Isolation=2-Way Control valve
 Valve I.D. #3=HOST"A" Tank Liquid 3-way valve (liquid to pump suction/liquid to surge tank)
 Valve I.D. #4=HOST"A" Tank Liquid 3-Way valve (liquid pump supply to HOST"A" tank/surge tank)
 Valve I.D. #5=HOST"A" Supply Tank Liquid 2-way valve (liquid supply/recv to/from truck/rail)
 Valve I.D. #6=HOST"A" Tank Liquid 2-way valve (liquid supplied feed; plant/atmospheric tank)
 Valve I.D. #6a/b=Vee-Balls for CMF from plant/atmospheric tank (optional)
 Valve I.D. #7=HOST"A" Tank Vapor 2-Way valve (vapor from HOST"A" tank to re-liquefaction unit)
 Valve I.D. #8=HOST"A" Tank Liquid—Common Liquid Header to HOST"B"-"C"-"D" or more
 Valve I.D. #9=HOST"A" Tank Liquid from valve #4 (pump discharge to surge/recirculation to tank)
Surge Tank: Valve I.D. #11=Surge Tank Liquid 2-Way Isolation=2-Way control valve
 Valve I.D. #12=Surge Tank Vapor 2-Way Isolation=2-way control valve
 Valve I.D. #13=Surge Tank Vapor 2-Way Isolation=2-Way control valve (Surge Tank By-Pass)
 Valve I.D. #14=Surge Tank Vapor 2-Way Isolation=2-Way Control valve
 Valve I.D. #15=Surge Tank Liquid 2-Way Isolation=2 Way Control Valve (Liq.To receiver/Host/rail)
 Valve I.D #16=Surge Tank Vapor 2-Way Isolation=2Way control valve (surge tank to reliq./GCU)
Transfer Line: Valve I.D. #21=Liquid Line 3-Way Isolation/recirculation from surge to Ship/Host tank/Rail
 Valve I.D #22=Vapor line 3-Way—Comp. disch./suction to/from surge/host tank/
 Valve I.D. #23=Vapor Line 2-Way Isolation from surge tank/receiver tank/compressor-bypass
 Valve I.D. #24=Vapor Line 3-Way—Comp. suct. Ship receiver tank/comp. disch to surge tank
 Valve I.D. #25=Vee-Ball Throttling 2-Way Control Valve (Upstream Liquid line CFM)
 Valve I.D. #26=Vee-Ball Throttling 2-Way Control Valve (Downstream Liquid line CFM)
 Valve I.D. #27=Vee-Ball Throttling 2-Way Control Valve (Upstream Vapor Line CFM)
 Valve I.D. #28=Vee-Ball Throttling 2-Way Control Valve (downstream Vapor Line CFM)
Compressor: Valve I.D. #31=Compressor Reversing Valve
 Valve I.D. #32=Compressor Reversing Valve Valve I.D. #33=Compressor Discharge Isolation 2-Way Control Valve
 Valve I.D. #34=Compressor/De-Mister suction Isolation=2-Way control Valve
 Valve I.D. #35=De-Mister Tank suction Isolation Valve=2-Way Control Valve
 Valve I.D. #36=Compressor Recycle Valve
Receiver
 Tank: Valve I.D. #41=Receiver Tank Liquid Line Isolation=2-Way control Valve
 Valve I.D. #42=Receiver Tank Vapor Line Isolation=2-Way Control Valve
 Valve I.D. #43=Receiver Tank Liquid Line Break-Away/Emergency release coupler
 Valve I.D. #44=Receiver Tank Vapor Line Break-Away/Emergency release coupler The present invention includes, a motion detection system, for liquefied gas fueling/transfer system, consisting of accelerometer(s), tri-axial accelerometer(s), inertial motion units, standing alone and/or any combination of which all may be coupled to processor(s) to computer motion, or simply a mechanical device(s) of predetermined length, which may contain a series electric circuit, alone and/or combined with any motion sensor(s) to determine if motion and/or excessive motion of fueling/transfer vehicle(s) has occurred. When activated, will produce/communicate an operational shut-down signal/relay, utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The present invention includes a motion detection system, a three-dimensional motion detection system which contains optical, ultrasonic, magnetic sensor(s), mechanical device(s) for fueling/transfer system seismic motion detection; seismic motion(s)/detection(s) beyond predetermined set point(s). When activated will produce/communicate an operational shut-down signal/relay, utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The present invention includes, a fire and or smoke detection system, utilizing magnetic and/or optical detection device(s), the device(s) may function standing alone and/or in combination with each other. When activated, will produce/communicate an operational shut-down signal/relay.

The present invention includes, an optical fire and or heat detection system, utilizing optical detection device(s), the device(s) contain ultraviolet and/or infrared detection function(s), the system combines the ultraviolet and/or infrared detector(s) to produce an output signal, of fire detection. When activated will produce/communicate an operational shut-down signal/relay.

The present invention includes, an explosion monitoring system, utilizing magnetic and/or ultrasonic and/or infrasonic transmitters and/or receivers/microphone(s)/array(s) there-of; to detect loud, sudden, sound/acoustic wave(s) and or pressure wave(s). When activated, will produce/communicate an operational shut-down signal/relay.

The present invention includes, an optical Arc/Spark/Lightening detection system; utilizing optical detection device(s), when activated will produce/communicate an operational shut-down signal/relay.

The present invention includes, a fueling/transfer communications signal detection program, where-by multiple communication methods are utilized for multiple fueling/transfer data communications. Where-as three communication signals are utilized and monitored, and if any one communication signal is dropped/non-functioning the system continues communications with two established links; but if two or more communication links/signals/transmission methods fail, a communication failure signal is produced, this output signal/relay will, when activated, communicate an operational shut-down signal/relay. Communications must be re-established to re-set and continue fueling/transfer operations.

The present invention includes, an optical satellite detection/alignment system. This system will detect best functional satellite communication(s) system, automatically align on-board receiving/transmitting equipment for optimal performance; and continuously monitoring, and readjusting for optimal signal strength.

The present invention includes, a network, for communication/data communication(s), for all sensor(s), actuator(s), input(s), output(s), controller(s)/microcontroller(s), processor(s)/micro-processor(s), computers, systems (fire/heat/explosion/motion/lock-outs/seismic/communication(s)) utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The present invention includes a network interface, which can communicate information and/or data between one or more computer system(s) and/or processor(s) by an optical connection such as by light transmitted by/through fiber optic cable(s), to detect omni-directional motion/fire/explosion detection/device(s)/other system/device(s), for the safe compressed gas and/or liquefied gas vehicle fueling/transfer(s) vehicle(s) and/or supplier system(s) apparatus/system(s), utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The present invention includes a network interface, which can communicate information and/or data between one or more computer system(s) and/or processor(s) with/by a radio (wave(s)), to detect omni-directional motion/fire/explosion detection/device(s)/other system/device(s), for the safe compressed gas and/or liquefied gas vehicle fueling/transfer(s) vehicle(s) and/or supplier system(s) apparatus/system(s), utilizing communication networks by multiple methods, may communicate signal(s) by wire/wirelessly by radio/light/and/or any combination of wire (coax/coax R F)/RFoF/wirelessly by radio/light/OWC, for network communications/signal(s) with central detection system/microcontroller/processor/locally and/or remote.

The present invention includes a network interface, which can communicate information and/or data between one or more computer system(s) and/or processor(s) with/by a radio wave(s); either local(ly) wave(s) and/or remotely via long distance radio wave(s)/satellite(s), to detect omni-directional motion/fire/explosion detection/device(s)/other system/device(s), for the safe compressed gas and/or liquefied gas vehicle fueling/transfer(s) vehicle(s) and/or supplier system(s) apparatus/system(s), utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The present invention includes any/all communication(s)/data communication(s)/network(s), between processor(s) and/or programmable logic controller(s), computer(s), interface(s), network interface(s), distributed control system(s), control system(s), Master system(s)/Master Data Base(s), web-server(s), for communications between supplier(s) and/or receiver(s) of any compressed and/or liquefied gas fuel handling system(s)/apparatus, a local area network transmitting data between interface(s), by wire (d)/cable(s)/Fiber-optic cable/RFoF/wirelessly, such as by radio and/or light/OWC and/or any combination of wire (d)/coax/coax R.F./RFoF/, to detect omni-directional motion/fire/explosion detection/device(s)/other system/device(s), for the safe compressed gas and/or liquefied gas vehicle fueling/transfer(s) vehicle(s) and/or supplier system(s) apparatus/system(s).

The present invention includes, a compressed/liquefied gas fueling/transfer system which utilizes a vapor displacement system, where-by vapor from receiving (filling) tank is removed via pressure build-up, and displaced/transferred to pressurize supplying tank(s) utilizing, tank(s), pipe(s), valve(s), and hose(s).

A vapor displacement system, for liquefied gas fueling/transfer; consisting of valves, tanks, pipes, hoses, couplers to utilize gaseous pressure build-up in a tank vapor head-space to push liquefied gas products utilizing gas/liquefied gas vapor pressure. (All in fluid communication via network of computers, controllers, programmable logic controllers, input and output devices.)

The present invention includes, a surge tank (which can be elevated surge tank, positioned at an elevation, greater than that of the receiving tank); for vapor separation/vapor pressurization/vapor head-space pushing of liquefied gas product out a lower (than liquid level) tank outlet/adapter.

The present invention includes, a plethora of control valves, which may be 2-way/3-way/reversing valve(s), to open/close/divert flow/paths of vapor/liquefied gases within/for vapor displacement system/liquefied gas transfer system(s).

The present invention includes, a fueling/transfer system, for liquefied/compressed gases, that utilizes vapor head space pressure and gravity/gas compression for liquid push, outlet at a lower than liquid level, outlet/adapter of the surge tank.

The present invention includes, a fueling/transfer system, for liquefied/compressed gases, that utilizes vapor head space pressure and separation device/gas pressure for liquid push, outlet at a lower than liquid level, outlet/adapter of the surge tank.

The present invention includes, a Bi-directional coreolis flow meter measurement system, to measure mass flow of compressed/liquefied gases, which consist(s) of vee-ball valve(s), temperature(s), pressure(s), and density compensated flow signal output(s).

The present invention includes, a Bi-directional sonic/ultrasonic flow meter (internal/external) for compressed/liquefied gases, which consists of temperature and pressure compensation for computed mass flow.

The present invention includes a motion detection system, a three-dimensional motion detection system which may contain optical, ultrasonic, magnetic sensor(s)/mechanical device(s)/sensor(s) for fueling/transfer vehicle motion detection; motion(s) beyond predetermined set point(s). When activated, will produce/communicate an operational shut-down signal/relay.

The present invention includes, a motion detection system, for liquefied gas fueling/transfer system, consisting of accelerometer(s), tri-axial accelerometer(s), inertial motion units, standing alone and/or any combination of which all may be coupled to processor(s) to computer motion, or simply a mechanical device(s) of predetermined length, which may contain a series electric circuit, alone and/or combined with any motion sensor(s) to determine if motion and/or excessive motion of fueling/transfer vehicle(s) has occurred. When activated, will produce/communicate an operational shut-down signal/relay, wirelessly, by radio or light.

The present invention includes, utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The present invention includes, network communications, which may communicate data by wire, wirelessly (by radio or light), which may operate locally by Local area network and/or remotely such as by a wide area network and/or any combination of wire (coax/coax R.F)/RFoF/wirelessly by radio/light/OWC, for network communications/signal(s)

The present invention includes a motion detection system, a three-dimensional motion detection system which contains optical, ultrasonic, magnetic sensor(s), mechanical device(s) for fueling/transfer system seismic motion detection; seismic motion(s)/detection(s) beyond predetermined set point(s). When activated will produce/communicate an operational shut-down signal/relay, utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The present invention includes, a fire and or smoke detection system, utilizing magnetic and/or optical detection device(s), the device(s) may function standing alone and/or in combination with each other. When activated, will produce/communicate an operational shut-down signal/relay.

The present invention includes, an optical fire and or heat detection system, utilizing optical detection device(s), the device(s) contain ultraviolet and/or infrared detection function(s), the system combines the ultraviolet and/or infrared detector(s) to produce an output signal, of fire detection. When activated will produce/communicate an operational shut-down signal/relay.

The present invention includes, an explosion monitoring system, utilizing magnetic and/or ultrasonic and/or infrasonic transmitters and/or receivers/microphone(s)/array(s) there-of; to detect loud, sudden, sound/acoustic wave(s) and or pressure wave(s). When activated, will produce/communicate an operational shut-down signal/relay.

The present invention includes, an optical Arc/Spark/Lightening detection system; utilizing optical detection device(s), when activated will produce/communicate an operational shut-down signal/relay.

The present invention includes, a fueling/transfer communications signal detection program, where-by multiple communication methods are utilized for multiple fueling/transfer data communications. Where-as three communication signals are utilized and monitored, and if any one communication signal is dropped/non-functioning the system continues communications with two established links; but if two or more communication links/signals/transmission methods fail, a communication failure signal is produced, this output signal/relay will, when activated, communicate an operational shut-down signal/relay. Communications must be re-established to re-set and continue fueling/transfer operations.

The present invention includes, an optical satellite detection/alignment system. This system will detect best functional satellite communication(s) signal, automatically align/transfer receiving/transmitting equipment for optimal performance; and continuously monitoring, and readjusting for optimal signal strength.

The present invention includes, a radio satellite detection/alignment system. This system will detect best functional satellite communication signal, automatically transfer/align on-board receiving/transmitting equipment for optimal communication signal, and continuously monitoring, and readjusting for optimal signal strength.

The present invention includes, a radio satellite detection/alignment system. This system will detect best functional satellite communication signal, automatically transfer/align on-board receiving/transmitting equipment for optimal communication signal, and continuously monitoring, and readjusting/switching antennae for optimal signal strength.

The present invention includes, an array of satellite detection/alignment devices/antennae, this system will detect optimal functional satellite signal and automatically transfer/switch for optimal optical/radio signal strength.

The present invention includes, a radio frequency signal detection/an array of frequencies/signal(s), this system will detect optimal functional radio frequency and automatically transfer/switch for optimal radio signal strength.

The present invention includes, a gas/liquefied gas fueling transfer system, utilizing optical communications, including Fiber to the antennae/FTTA signal(s)/data/transmissions.

The present invention includes, a gas/liquefied gas fueling/transfer system, utilizing cellular communications including all voice/data/information communication systems.

The present invention includes, a gas/liquefied gas fueling/transfer system, utilizing a local area network (LAN), standing alone and or combined in communication with a wide area network (WAN).

The present invention includes, a gas/liquefied gas fueling/transfer system, utilizing a WAN, standing alone and/or combined with a LAN network.

The present invention includes, a gas/liquidified gas fueling/transfer system, utilizing Graphic Processing Unit (GPU)/Graphics processing unit processing unit (GPUPU); for data/information/artificial intelligence processing. This processor may be arrayed/stand alone and/or be combined with other processing units/PLC's/networked devices for system operations.

The present invention includes, a gas/liquefied gas fueling/transfer system, utilizing an Integrated Processing unit (IGPU); for data/information/artificial intelligence processing. This processor may be arrayed/stand alone and/or be combined with other processing units/PLC's/networked devices for system operations The present invention includes, a gas/liquefied gas fueling/transfer system, utilizing an External Processing unit (EPU); for data/information/artificial intelligence processing. This processor may be arrayed/stand alone and/or be combined with other processing units/PLC's/networked devices for system operations.

The present invention includes, a gas/liquefied gas fueling/transfer system, utilizing Quantum Processing unit; for data/information/artificial intelligence processing. This processor may be arrayed/stand alone and/or be combined with other processing units/PLC's/networked devices for system operations.

The present invention includes, a gas/liquefied gas fueling/transfer system, utilizing Artificial Intelligence/Machine Learning processes/Hy-Brid intelligence/Deep Learning to achieve repetitive operation(s)/information recall/Voice recognition/Commands/Image Processing/Image retrieval/Object recognition/Data Mining/Motion-Seismic processing/responses/Fire detection/mechanical manipulation(s) and/or motions (weather a part is-is not in proper position).

The present invention includes, a gas/liquefied gas fueling/transfer system, utilizing optical inputs/outputs for artificial intelligence network operations.

The present invention includes, a gas/liquefied gas fueling/transfer system, utilizing magnetic I/O for A.I. network operations.

The present invention includes, a gas/liquefied gas fueling/transfer system, utilizing ultrasonic I/O for A.I. network operations.

The present invention includes, a gas/liquefied gas fueling/transfer system, utilizing voice activated commands.

The present invention includes, a gas/liquefied gas fueling/transfer system, utilizing voice/word recognition system(s)/program(s); for system "STOP"/"Emergency Stop"/"E-STOP"/Controlled Stop/System Shut-down.

The present invention includes, a gas/liquefied gas fueling/transfer system, utilizing word recognition "FIRE".

The present invention includes, a gas/liquefied gas fueling/transfer system, utilizing word recognition "STOP".

The present invention includes, a gas/liquefied gas fueling/transfer system, utilizing word recognition "HALT".

The present invention includes, a gas/liquefied gas fueling/transfer system, utilizing word recognition "LEAK".

The present invention includes, a gas/liquefied gas fueling/transfer system, utilizing word recognition "PROBLEM".

The present invention includes, a gas/liquefied gas fueling/transfer system, utilizing word recognition "TROUBLE".

The present invention includes, a gas/liquefied gas fueling/transfer system, utilizing word recognition "Shut DOWN".

The present invention includes, a gas/liquefied gas fueling/transfer system, utilizing word recognition "SYSTEM OFF".

The present invention includes, a gas/liquefied gas fueling/transfer system, utilizing word recognition "HELP".

The present invention includes, a gas/liquefied gas fueling/transfer system, utilizing word recognition "CALL FIRE DEPARTMENT/911".

The present invention includes, a gas/liquefied gas fueling/transfer system, utilizing word recognition "EMERGENCY".

The present invention includes, a gas/liquefied gas fueling/transfer system, utilizing word recognition "ISOLATE".

The present invention includes, a gas/liquefied gas fueling/transfer system, utilizing word recognition "CLOSE VALVES".

The present invention includes, a gas/liquefied gas fueling/transfer system, utilizing word recognition "RELEASE hoses/vehicle".

The present invention includes, a gas/liquefied gas fueling/transfer system, utilizing word recognition program, utilizing all listed words standing alone and/or in any combination to alert system to STOP/Shut-down.

The present invention includes, a gas/liquefied gas fueling/transfer system, utilizing word recognition program(s) of all global languages/translations/interpretations of words for proper understanding and output action(s).

The present invention includes, a gas/liquefied gas fueling/transfer system, utilizing gesture recognition system(s)/program(s).

The present invention includes, a gas/liquefied gas fueling/transfer system, utilizing an oxygen detection system, the system may include optical, magnetic, ultrasonic, or chemical detection devices. This system may monitor oxygen content with-in the tank(s) and/or transfer/fueling system(s) to alert of excess oxygen content presence. Different levels/readings will have multiple output/relays/actions for proper system control.

The present invention includes, a gas/liquefied gas fueling/transfer system, utilizing a tank vacuum insulation monitoring system, this system will utilize compound pressure monitoring devices, and will alert at different vacuum pressure levels for manual and/or automatic system operation/control.

The present invention includes, a network, for communication/data communication(s), for all sensor(s), actuator(s), input(s), output(s), controller(s)/microcontroller(s), processor(s)/micro-processor(s), computers, systems (fire/heat/explosion/motion/lock-outs/seismic/communication(s)) utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The present invention includes a network interface, which can communicate information and/or data between one or more computer system(s) and/or processor(s) by an optical connection such as by light transmitted by/through fiber optic cable(s), to detect omni-directional motion/fire/explosion detection/device(s)/other system/device(s), for the safe compressed gas and/or liquefied gas vehicle fueling/transfer(s) vehicle(s) and/or supplier system(s) apparatus/system(s), utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The present invention includes a network interface, which can communicate information and/or data between one or more computer system(s) and/or processor(s) with/by a radio (wave(s)), to detect omni-directional motion/fire/explosion detection/device(s)/other system/device(s), for the safe compressed gas and/or liquefied gas vehicle fueling/transfer(s) vehicle(s) and/or supplier system(s) apparatus/system(s), utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The present invention includes a network interface, which can communicate information and/or data between one or more computer system(s) and/or processor(s) with/by a radio wave(s); either local(ly) wave(s) and/or remotely via long distance radio wave(s)/satellite(s), to detect omni-directional motion/fire/explosion detection/device(s)/other system/device(s), for the safe compressed gas and/or liquefied gas vehicle fueling/transfer(s) vehicle(s) and/or supplier system(s) apparatus/system(s), utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The present invention includes any/all communication(s)/data communication(s)/network(s), between processor(s) and/or programmable logic controller(s), computer(s), interface(s), network interface(s), distributed control system(s), control system(s), Master system(s)/Master Data Base(s), web-server(s), for communications between supplier(s) and/or receiver(s) of any compressed and/or liquefied gas fuel handling system(s)/apparatus, a local area network transmitting data between interface(s), by wire (d)/cable(s)/Fiber-optic cable/RFoF/wirelessly, such as by radio and/or light/OWC and/or any combination of wire (d)/coax/coax R.F./RFoF/, to detect omni-directional motion/fire/explosion detection/device(s)/other system/device(s), for the safe compressed and/or liquefied gas vehicle fueling/transfer(s) vehicle(s) and/or supplier system(s) apparatus/system(s).

The invention includes, a network, a quantum network, for communication/data communication(s), for all sensor(s), actuator(s), input(s), output(s), controller(s)/micro-controller(s), The invention includes, a fueling/transfer communications signal detection program, where-by multiple communication methods are utilized for multiple fueling/transfer data communications. Where-as three communication signals are utilized and monitored, and if any one communication signal is dropped/non-functioning the system continues communications with two established links; but if two or more communication links/signals/transmission methods fail, a communication failure signal is produced, this output signal/relay will, when activated, communicate an operational shut-down signal/relay. Communications must be re-established to re-set and continue fueling/transfer operations.

The invention includes, an optical satellite detection/alignment system. This system will detect best functional satellite communication(s) system, automatically align on-board receiving/transmitting equipment for optimal performance; and continuously monitoring, and readjusting for optimal signal strength.

processor(s)/micro-processor(s), computers, systems (fire/heat/explosion/motion/lock-outs/seismic/communication(s)) utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The invention includes a quantum network interface, which can communicate information and/or data between one or more computer system(s) and/or processor(s) by an optical connection such as by light transmitted by/through fiber optic cable(s), to detect omni-directional motion/fire/explosion detection/device(s)/other system/device(s), for the safe compressed gas and/or liquefied gas vehicle fueling/transfer(s) vehicle(s) and/or supplier system(s) apparatus/system(s), utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The invention includes a quantum network interface, which can communicate information and/or data between one or more computer system(s) and/or processor(s) with/by a radio (wave(s)), to detect omni-directional motion/fire/explosion detection/device(s)/other system/device(s), for the safe compressed gas and/or liquefied gas vehicle fueling/transfer(s) vehicle(s) and/or supplier system(s) apparatus/system(s), utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The invention includes a quantum network interface, which can communicate information and/or data between one or more computer system(s) and/or processor(s) with/by a radio wave(s); either local(ly) wave(s) and/or remotely via long distance radio wave(s)/satellite(s), to detect omni-directional motion/fire/explosion detection/device(s)/other system/device(s), for the safe compressed gas and/or liquefied gas vehicle fueling/transfer(s) vehicle(s) and/or supplier system(s) apparatus/system(s), utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The invention includes any/all communication(s)/data communication(s)/quantum network(s), between processor(s) and/or programmable logic controller(s), computer(s), interface(s), network interface(s), distributed control system(s), control system(s), Master system(s)/Master Data Base(s), web-server(s), for communications between supplier(s) and/or receiver(s) of any compressed and/or liquefied gas fuel handling system(s)/apparatus, a local area network transmitting data between interface(s), by wire (d)/cable(s)/Fiber-optic cable/RFoF/wirelessly, such as by radio and/or light/OWC and/or any combination of wire (d)/coax/coax R.F./RFoF/, to detect omni-directional motion/fire/explosion detection/device(s)/other system/device(s), for the safe compressed gas and/or liquefied gas vehicle fueling/transfer(s) vehicle(s) and/or supplier system(s) apparatus/system(s).

The invention includes, a motion detection system, for liquefied gas fueling/transfer system, consisting of accelerometer(s), tri-axial accelerometer(s), inertial motion units, standing alone and/or any combination of which all may be coupled to processor(s) to computer motion, or simply a mechanical device(s) of predetermined length, which may contain a series electric circuit, alone and/or combined with any motion sensor(s) to determine if motion and/or excessive motion of fueling/transfer vehicle(s) has occurred. When activated, will produce/communicate an operational shut-down signal/relay, wirelessly, by radio or light.

The invention includes, quantum communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The invention includes, quantum network communications, which may communicate data by wire, wirelessly (by radio or light), which may operate locally by Local area network and/or remotely such as by a wide area network and/or any combination of wire (coax/coax R.F)/RFoF/wirelessly by radio/light/OWC, for network communications/signal(s)

The invention includes a motion detection system, a three-dimensional motion detection system which contains optical, ultrasonic, magnetic sensor(s), mechanical device(s) for fueling/transfer system seismic motion detection; seismic motion(s)/detection(s) beyond predetermined set point(s). When activated will produce/communicate an operational shut-down signal/relay, utilizing quantum communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The invention includes, a fire and or smoke detection system, utilizing magnetic and/or optical detection device(s), the device(s) may function standing alone and/or in combination with each other. When activated, will produce/communicate an operational shut-down signal/relay.

The invention includes, an optical fire and or heat detection system, utilizing optical detection device(s), the device(s) contain ultraviolet and/or infrared detection function(s), the system combines the ultraviolet and/or infrared detector(s) to produce an output signal, of fire detection. When activated will produce/communicate an operational shut-down signal/relay.

The invention includes, an explosion monitoring system, utilizing magnetic and/or ultrasonic and/or infrasonic transmitters and/or receivers/microphone(s)/array(s) there-of; to detect loud, sudden, sound/acoustic wave(s) and or pressure wave(s). When activated, will produce/communicate an operational shut-down signal/relay.

The invention includes, an optical Arc/Spark/Lightening detection system; utilizing optical detection device(s), when activated will produce/communicate an operational shut-down signal/relay.

The invention includes, a fueling/transfer quantum communications signal detection program, where-by multiple communication methods are utilized for multiple fueling/transfer data communications. Where-as three communication signals are utilized and monitored, and if any one communication signal is dropped/non-functioning the system continues communications with two established links; but if two or more communication links/signals/transmission methods fail, a communication failure signal is produced, this output signal/relay will, when activated, communicate an operational shut-down signal/relay. Communications must be re-established to re-set and continue fueling/transfer operations.

The invention includes, an optical satellite detection/alignment system. This quantum computer system will detect best functional satellite communication(s) signal, automatically align/transfer receiving/transmitting equipment for optimal performance; and continuously monitoring, and readjusting for optimal signal strength.

The invention includes, a radio satellite detection/alignment system. This quantum computer system will detect best functional satellite communication signal, automatically transfer/align on-board receiving/transmitting equipment for optimal communication signal, and continuously monitoring, and readjusting for optimal signal strength.

The invention includes, a radio satellite detection/alignment system. This quantum computer system will detect best functional satellite communication signal, automatically transfer/align on-board receiving/transmitting equipment for optimal communication signal, and continuously monitoring, and readjusting/switching antennas for optimal signal strength.

The invention includes, an array of satellite detection/alignment devices/antennae, this quantum computer system will detect optimal functional satellite signal and automatically transfer/switch for optimal optical/radio signal strength.

The invention includes, a radio frequency signal detection/an array of frequencies/signal(s), this quantum computer system will detect optimal functional radio frequency and automatically transfer/switch for optimal radio signal strength.

The invention includes, a gas/liquefied gas fueling transfer system, utilizing quantum optical communications, including Fiber to the antennae/FTTA signal(s)/data/transmissions.

The invention includes, a gas/liquefied gas fueling/transfer system, utilizing cellular communications including all voice/data/information communication systems.

The invention includes, a gas/liquefied gas fueling/transfer system, utilizing a quantum local area network (LAN), standing alone and or combined in communication with a wide area network (WAN).

The invention includes, a gas/liquefied gas fueling/transfer system, utilizing a quantum WAN, standing alone and/or combined with a LAN network.

The invention includes, a gas/liquidified gas fueling/transfer system, utilizing Graphic Processing Unit (GPU)/Graphics processing unit processing unit (GPUPU); for data/information/artificial intelligence processing. This processor may be arrayed/stand alone and/or be combined with other processing units/PLC's/networked devices for system operations.

The invention includes, a gas/liquefied gas fueling/transfer system, utilizing an Intergrated Processing unit (IGPU); for data/information/artificial intelligence processing.

This processor may be arrayed/stand alone and/or be combined with other processing units/PLC's/networked devices for system operations The invention includes, a gas/liquefied gas fueling/transfer system, utilizing an External Processing unit (EPU); for data/information/artificial intelligence processing. This processor may be arrayed/stand alone and/or be combined with other processing units/PLC's/networked devices for system operations.

The invention includes, a gas/liquefied gas fueling/transfer system, utilizing Quantum Processing unit; for data/information/artificial intelligence processing. This processor may be arrayed/stand alone and/or be combined with other processing units/PLC's/networked devices for system operations.

The invention includes, a gas/liquefied gas fueling/transfer system, utilizing quantum computer for Artificial Intelligence/Machine Learning processes/Hy-Brid intelligence/Deep Learning to achieve repetitive operation(s)/information recall/Voice recognition/Commands/Image Processing/Image retrieval/Object recognition/Data Mining/Motion-Seismic processing/responses/Fire detection/mechanical manipulation(s) and/or motions (weather a part is-is not in proper position).

The invention includes, a gas/liquefied gas fueling/transfer system, utilizing quantum network optical inputs/outputs for artificial intelligence network operations.

The invention includes, a gas/liquefied gas fueling/transfer system, utilizing magnetic I/O for A.I. quantum network operations.

The invention includes, a gas/liquefied gas fueling/transfer system, utilizing ultrasonic I/O for A.I. quantum network operations.

The invention includes, a gas/liquefied gas fueling/transfer system, utilizing quantum computer for voice activated commands.

The invention includes, a gas/liquefied gas fueling/transfer system, utilizing quantum computer voice/word recognition system(s)/program(s); for system "STOP"/"Emergency Stop"/"E-STOP"/Controlled Stop/System Shut-down.

The invention includes, a gas/liquefied gas fueling/transfer system, utilizing word recognition "FIRE".

The invention includes, a gas/liquefied gas fueling/transfer system, utilizing word recognition "STOP".

The invention includes, a gas/liquefied gas fueling/transfer system, utilizing word recognition "HALT".

The invention includes, a gas/liquefied gas fueling/transfer system, utilizing word recognition "LEAK".

The invention includes, a gas/liquefied gas fueling/transfer system, utilizing word recognition "PROBLEM".

The invention includes, a gas/liquefied gas fueling/transfer system, utilizing word recognition "TROUBLE".

The invention includes, a gas/liquefied gas fueling/transfer system, utilizing word recognition "Shut DOWN".

The invention includes, a gas/liquefied gas fueling/transfer system, utilizing word recognition "SYSTEM OFF".

The invention includes, a gas/liquefied gas fueling/transfer system, utilizing word recognition "HELP".

The invention includes, a gas/liquefied gas fueling/transfer system, utilizing word recognition "CALL FIRE DEPARTMENT/911".

The invention includes, a gas/liquefied gas fueling/transfer system, utilizing word recognition "EMERGENCY".

The invention includes, a gas/liquefied gas fueling/transfer system, utilizing word recognition "ISOLATE".

The invention includes, a gas/liquefied gas fueling/transfer system, utilizing word recognition "CLOSE VALVES".

The invention includes, a gas/liquefied gas fueling/transfer system, utilizing word recognition "RELEASE hoses/vehicle".

The invention includes, a gas/liquefied gas fueling/transfer system, utilizing quantum computer word recognition program, utilizing all listed words standing alone and/or in any combination to alert system to STOP/Shut-down.

The invention includes, a gas/liquefied gas fueling/transfer system, utilizing quantum computer word recognition program(s) of all global languages/translations/interpretations of words for proper understanding and output action(s).

The invention includes, a gas/liquefied gas fueling/transfer system, utilizing quantum computer gesture recognition system(s)/program(s).

The invention includes, a gas/liquefied gas fueling/transfer system, utilizing quantum computer for oxygen detection system, the system may include optical, magnetic, ultrasonic, or chemical detection devices. This system may monitor oxygen content with-in the tank(s) and/or transfer/fueling system(s) to alert of excess oxygen content presence. Different levels/readings will have multiple output/relays/actions for proper system control.

The invention includes, a gas/liquefied gas fueling/transfer system, utilizing quantum computer for a tank vacuum insulation monitoring system, this system will utilize compound pressure monitoring devices, and will alert at different vacuum pressure levels for manual and/or automatic system operation/control.

The invention includes, a network, for communication/data communication(s), for all sensor(s), actuator(s), input(s), output(s), controller(s)/microcontroller(s), processor(s)/micro-processor(s), computers, systems (fire/heat/explosion/motion/lock-outs/seismic/communication(s)) utilizing quantum communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The invention includes a quantum network interface, which can communicate information and/or data between one or more computer system(s) and/or processor(s) by an optical connection such as by light transmitted by/through fiber optic cable(s), to detect omni-directional motion/fire/explosion detection/device(s)/other system/device(s), for the safe compressed gas and/or liquefied gas vehicle fueling/transfer(s) vehicle(s) and/or supplier system(s) apparatus/system(s), utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The invention includes a quantum network interface, which can communicate information and/or data between one or more computer system(s) and/or processor(s) with/by a radio (wave(s)), to detect omni-directional motion/fire/explosion detection/device(s)/other system/device(s), for the safe compressed gas and/or liquefied gas vehicle fueling/transfer(s) vehicle(s) and/or supplier system(s) apparatus/system(s), utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The invention includes a quantum network interface, which can communicate information and/or data between one or more computer system(s) and/or processor(s) with/by a radio wave(s); either local(ly) wave(s) and/or remotely via long distance radio wave(s)/satellite(s), to detect omni-directional motion/fire/explosion detection/device(s)/other system/device(s), for the safe compressed gas and/or liquefied gas vehicle fueling/transfer(s) vehicle(s) and/or supplier system(s) apparatus/system(s), utilizing communication networks by multiple methods, may communicate signal(s) by wire/wirelessly by radio/light/and/or any combination of wire (coax/coax R.F)/RFoF/wirelessly by radio/light/OWC, for network communications/signal(s) with central detection system/microcontroller/processor/locally and/or remote.

The invention includes quantum communication(s)/data communication(s)/network(s), between processor(s) and/or programmable logic controller(s), computer(s), interface(s), network interface(s), distributed control system(s), control system(s), Master system(s)/Master Data Base(s), webserver(s), for communications between supplier(s) and/or receiver(s) of any compressed and/or liquefied gas fuel handling system(s)/apparatus, a local area network transmitting data between interface(s), by wire (d)/cable(s)/Fiber-optic cable/RFoF/wirelessly, such as by radio and/or light/OWC and/or any combination of wire (d)/coax/coax R.F./RFoF/, to detect omni-directional motion/fire/explosion detection/device(s)/other system/device(s), for the safe compressed gas and/or liquefied gas vehicle fueling/transfer(s) vehicle(s) and/or supplier system(s) apparatus/system(s).

Onboard Internally Recirculating Chemical Looping Combustion System

In the global movement to clean and De-Carbonize vehicle emissions, evolving technologies are improving and merging to achieve zero and/or near zero emissions. The systems and processes are more complex, but necessary to meet requirements for cleaner vehicle emissions.

There are also multiple different systems and/or paths for fuel consumption. The combustion engine has been vastly improved to increase efficiency and reduce emissions, now achieving near zero emissions. The vehicle emission reductions, when quantified, are substantial, and clean fuels are a key component of the reductions. There are also turbines/micro-turbines, rotary engines, and various types of fuel cells. Fuel cell efficiency as well as internal combustion, may also be improved with increased oxygen % percentage(s) of system intake. Oxygen/Natural Gas/Butane/Hydrogen/Propane/ethane/ammonia (NGHF'ETA/O) may be separated, and or produced onboard or it may be supplied as a compressed/liquefied gas; also, any onboard reformer/gas cleaving cleaving/separation process onboard is also with-in the scope of this invention; such as stripping H2 out from CH-4, by high temp./steam cracking/reformer on the vehicle, for use as fuel/fuel-compound/oxidizer This system, Onboard Internally Recirculating Chemical Looping Combustion System(s)(IRCLCS), has a different path and method for fuel consumption. The IRCLCS has several distinct features which will change the worlds' shipping and power industries for the better, and supply power to onshore power grids and near shore facilities with clean, decarbonized energy.

The IRCLCS system, which will produce clean energy, from multiple, yet, interconnected sources, with highly efficient processes, which will yield greater power output, consuming less fuel, and with near zero emissions. The use of steam methane reformer(s)(SMR), of which their may be multiple, auxiliary units, for additional Hydrogen production during longer port calls. SMR's coupled with a water-gas shift reformer, will yield higher quantities of Hydrogen. Plus, use of palladium alloy with silver in the pressure swing absorption system yields higher quality hydrogen, and the by-products (tail gas) will be recycled back into the fuel reformer and consumed, thus yielding a greater CO2 quality and yield for capture, and liquefied for storage. The carbon dioxide may also be later sold to cement manufactures for use in new production process. The Hydrogen produced will contribute to over all system fuel efficacy. Plus innovative waste heat recovery exchangers, coupled to smaller generators will also increase over-all system efficiencies; all for a low carbon energy solution.

The IRCLCS process makes use of oxygen carriers, such as metal oxides, which are circulated and/or recirculate, by pneumatic transfer and gravity. The metal oxides are oxidized in the oxidizer reformer, which oxidizes and transfers via (Bed) Air Blower (AB) up to a cyclone vessel, and then dropped via gravity due to decrease of flow rate; of feet per second (FPS), drop-off due to greater volume of cyclone. The angled cyclone, greater than the angle of repose, will ensure metal oxides fall into the "KAT SEAL", via gravity. A flue outlet at top of cyclone will capture system heat and transfer to the optional pre and post super heater headers, the flue gas may be drawn downward via an induced draft fan with variable speed control, this inverted heat trap is designed for system heat capture, may also contain an optional aqueous ammonia injection system for NOX reduction, along with an automatic self cleaning, (bag) filtering system.

The Kat seal is also part of the process, it physically separates major parts of the system, yet it connects them. The Kat seal utilizes a "trap" style configuration, with an auger and/or bucket lift system, where-by, the seal is created by a "Build-up" of the metal oxide bed materials, but the auger and/or bucket lift, plus gravity keeps progressing bed material from the cyclone into the combustion reformer, thus continuously feeding the combustion reformer with re-oxidized metal oxide bed material for consumption. Therefore the Kat-Seal separates the Oxidizer Reformer and/or the cyclone from the Combustion Reformer, but it also connects them.

The Fuel reformer, which has several feeds, and exit, is also a feature of this invention. The Fuel reformer and/or the combustion reformer, uniquely consumes the fuel via oxidization; not the direct fuel to air combustion, as in a standard Internal Combustion Engine. It is combustion via oxidization, not controlled detonation. It is also referred to as closed loop combustion with oxygen un-coupling. This fuel consumption also occurs upon and/or with-in a fluidized bed, via the Combustion Bed Blower, mixing the fuel(s) and the oxidizer together for the chemical reaction; fuel(s) and oxidizer(s).

The combustion reformer may have several feeds; oxidized fluidized bed media, and/or metal oxide feed from the cyclone Kat seal. Fuel, which may be natural gas, propane, butane, ethane, hydrogen, syn-gas, Bio-methane, plus and gas mixture and/or combination, ammonia, plus many different solid, liquid, or vapor fuels. Another feed is the "By-Products gas" feed, this is recycled tail gas from the Pressure swing absorbers, which separates out Hydrogen gas; which is an exit stream from the Steam methane reformer, which may reside with-in (combined) the fuel and or combustion reformer, or stand alone, and saturated purified steam is then introduced into flow path, which, increase hydrogen yield. This Purified Hydrogen stream may then be stored as compressed and/or liquefied gas and/or fed to a fuel cell and/or any engine onboard, or it may be "Spiked" into natural gas engine feed system for addition clean energy efficiency.

The combustion reformer may also have an oxygen feed, this stream will supply gaseous oxygen for improved fuel reaction and/or fuel consumption and/or combustion. All of the fuel feeds to the combustion and/or fuel reformer will be controlled via N.C. control valves with positive position feed back, and fuel, oxygen, tail gas will be fed thru a double block and bleed plus metering arrangement for safety.

The onboard fuel cell(s), which are fed with the separated hydrogen, which is cleaved and/or processed by onboard steam methane reformer(s), and PSA's, may also improve efficacy utilizing oxygen into it's intake feed system. This oxygen may be produced onboard, such as by oxygen concentrator and/or ozone generation, and/or supplied as a gas and/or liquefied gas LOX from onboard storage. Oxygen as an oxidizer can have several different chemical make-up's, such as pure oxygen, liquefied oxygen, O2, O3 (oxygen triplet), ozone, O4 tetraoxo and/or tetraozone, all are oxidizer(s) agents, all may be liquefied, all may be produced onboard and or supplied as gas and/or liquefied gas for these innovative processes and system(s). The Oxyhydrogen will improve fuel cell performance, and excess thermal may also generate improved performance via Rankin cycle loop. The compressed/liquefied gas oxygen may be supplied in sea-container like exchangeable tanks/fix onboard vessels.

Another feature of the Fuel Reformer and/or combustion reformer is that since the combustion process oxidizes the fuel, rather than controlled detonation of fuel, the emission(s) volume is reduced. The fuel reformer emissions contain mainly carbon dioxide (CO2) and water vapor (H2O), which are further separated, then CO2 is compressed and liquefied for onboard storage, such as a Type "C" sea-container for safe removal and/or swap-out during re-fueling. The exchangeable tank(s) and/or sea container(s) may be set upon load cells for measurement of CO2 quantity. The IRCLCS reduces the need for an air separation unit, saving Capex dollars, valuable space, plus OPEX costs.

The fuel reformer and/or combustion reformer bed material is continuously moving and/or transferred, via another "KAT SEAL", this Kat seal separates and/or connects the fuel and/or combustion reformer to the air and/or oxidizer reformer. The systems' "Kat Seal(s)" keep the reformers separated, but connected, via continuously transferring oxidizing bed media material.

The Kat seals are also part of this process, they physically separate major parts of the system, yet they connect them. The Kat seal utilizes a "trap" style configuration, with an auger/screw and/or bucket system, which may be single or double axle drive, and may be electric, hydraulic, driven, with/with-out gear drive, plus variable speed and reverse for catalyst level control. The seal is created by a "Build-up" of the metal oxide bed materials, but the auger screw and/or bucket lift, plus gravity keeps progressing bed material from the combustion and/or fuel reformer into the air and/or oxidizer reformer, thus continuously feeding the air and/or oxidizer reformer with spent metal oxide bed material for RE-oxidization process. Therefore the Kat-Seal separates the Combustion and/or fuel Reformer from the air and/or oxidizer Reformer, but it also connects them.

This continuous LOOPING of the oxidizing reagent give way to it's name: "Onboard Internally Recirculating Chemical Looping Combustion System". The Kat Seal system may have optional air nozzles, to aid with stubborn transfer.

The system has several critical design and control system features for proper continuous operation. The size, pressure, and shape of the oxidizer, and Bed blower volume and pressure must be such that the feet per second flow is proper for metal oxide carry over (pneumatic flow) and cyclone sizing for material drop out. The cyclone to fuel reformer loop seal; size, shape design, pressure, and bed blower volume be such that proper fluidized material transfer is maintained with proper a seal. The fuel and/or combustion reformer design, which may (or may not) contain steam methane reformer with-in, is properly sized, located (above oxidizer reformer bed, for gravity feed via loop seal), with proper fuel bed blower volume, pressure, flow distribution, with bottom fuel, tail gas, and oxygen feed systems, via Normally Closed control valves. Plus a fuel/combustion reformer to oxidizer reformer "Kat SEAL", which will act as a seal, but also transfers continuously feeding of metal oxide for regeneration, via loop seal bubbling bed blower and gravity.

The system will generate thermal energy, which may be converted to High pressure steam, and cycled thru a steam turbine for generation of electric power and/or shaft output power, and/or to auxiliary steam methane reformer(s), for additional Hydrogen production (such as while ship is at idle in port).

This invention also includes battery electric storage units. These optional battery storage units may utilize sea container(s) and/or sized like sea containers for ease of handling, but the system may store excess electrical energy, such as during a port call, when vehicle is at rest, and use later when demand is needed. The continuously operated chemical looping system is designed for continuous operation, therefore sizing of system(s) and/or Hybrid battery system should be considered, as functionally operational system requires. (ie, short hauls vs. long journeys). The best option is to have sufficient battery power to operate entire IRCLCS for operations to trouble-shoot power interruption, therefore keeping internally recirculating chemical looping combustion system continuously functioning, avoiding shut downs and re-starts, which are rather lengthy endeavors, by properly sized battery electric back-up system will enable continuously operations of the IRCLCS system, very advantageous.

The reformers may have water jacket(s)/walls and optional wing walls for steam generation. The system may also utilize optional pre-super heater and post super heaters with attemporation system to condition steam for steam turbine (lowering steam output temp. while maintaining steam pressure), via a distilled water condenser, steam from header condensed out with feed water from boiler feed water system (pump & conditioning), thus elevating boiler feed-water temperature. The feed-water riser may be inside down-comer for additional economizer energy recovery.

Other, additional benefits of this system, can be the utilization of scavenger heat. This system has multiple outlets for heat recovery. First, between steam turbine and condenser, a heat recovery exchanger can capture more thermal energy for utilization. Second, in the flue gas downcomer, a heat exchanger can capture thermal energy. Third, in the SMR output line to the PSA, a heat exchanger may recover thermal energy. Fourth, in the CO2/H2O exhaust line, an exchanger may capture thermal energy. And fifth, the heat generated by the fuel cell(s) can be recovered, and utilized in a Rankine Cycle. All five points of thermal capture may utilize a local Rankine Cycle Turbo-expander system with electrical generation benefit; the optional Rankine cycle system(s) will add up to enhanced system efficiencies and/or fuel economy, all while producing no emissions profile, efficient use of waste heat for extra power production.

This unique IRCLCS, is scalable, which means is can be sized for ship power, locomotive power, ship to ship power (such as power for another vehicle (ship) during port stay), or mechanized barge vehicle, to provide self power but also for merchant power to remote islands, villages, or even feeding a decommissioned power plant via existing transmission and distribution grid infrastructure. As stated, "continuously" this system is designed for continuous operation, stopping and starting is not recommended, therefore long term operational design is optimum. Plus Ports and Harbors will appreciate surrogate ultra clean power supply with near zero and/or zero emissions during port calls.

This invention also includes multiple onboard power system matchings, such as an IRCLCS along with one or more internal combustion engine(s), possibly utilizing the same fuel, but completely isolated by fire proof and/or explosion proof safeing walls. The match engine(s) will mainly act as stand-by, which also may be coupled to it's own separate electrical generator and/or direct drive and/or both. This redundant safety feature of an addition power system(s) ensures reliability in case one system may have a failure.

The IRCLCS system may have a "Bag-Style" cleaning system, which captures particulate matter with-in the exhaust stream. This system will contain alternating "Bag-House" units, so that one is always "On-Line" while the other is in clean mode. The program will automatically alternate, but a High Differential Pressure system may override and increase cleaning cycle if differential pressure system indicates dirty filter exist. The system will remove particulate matter from exhaust stream and properly dispose of, for further dumpster handling. This exhaust cleaning process will ensure no noticeable PM escapes via the exhaust outlet.

System(s), component(s), control(s), for IRCLCS system functionality.

Oxidizer Reformer, Cyclone, Fuel and/or Combustion reformer, cyclone to fuel reformer Kat seal, fuel reformer to oxidizer reformer Kat seal, Air bed blower for oxidizer, air bed blower for fuel reformer, bed air blowers for two loop seals, Induced draft fan, bag house, hydraulic pressure unit, lube oil unit, Battery electric storage unit, Steam Methane reformer(s), saturated pure water steam injection system, water purification system (carbon filtering, de-mineralizing, de-ionizing, reverse osmosis system, ultra-violet light filtering, for zero.zero microsiemen water) water walls, wing walls, steam drum, distilled water condenser, boiler feed water pump & controls, differential pressure (D/P) and/or IRCLCS flow and or temperature measurement and/or transmitter (xmtr) across oxidized bed, across oxidizer, across oxidizer to cyclone, from cyclone to flue gas downcomer, across cyclone, across Kat seal from cyclone to fuel reformer, across fuel reformer, across fuel reformer bed, across smr, across fuel reformer to gas outlet to PSA, across PSA, across Kat seal from fuel reformer to oxidizer, Optical, magnetic, ultrasonic measurements of air, gas(s), fuel(s), oxygen, steam, boiler feed water, flue gas, emission(s), tail gas(s), for temperature, pressure, level, flow, opacity, spectrometer analyzer(s), atmospheric monitoring including L.E.L./U.E.L./emission levels/oxygen level(s), oxygen detection with-in fuel reformer system. The system contains many different flow paths/tank(s)/piping/valve arrangements, therefore a plethora of temperature/pressure/level/flow measurement devices used to sense, and/or control the liquefied gas fueling/transfer(s) and/or vapor displacement and/or transfer(s) are with-in the scope of this invention. Plethora of the sensor(s) and/or outputs may have xmtrs that communicate with system(s)/may communicate signal(s) by wire/wirelessly by radio/light/and/or any combination of wire (coax/coax R F)/RFoF/wirelessly by radio/light/OWC, for network communications and/or signal(s) with central detection system/microcontroller/processor/locally or remote, also fuel level, storage systems, delivery systems.

Following list of control valves shall contain positive position feed back signal for Fuel, Oxygen, Tail gas, Air, ammonia, Flue gas, exhaust gas, CO2, H2, gas/liquid/storage, bed ash outlet rotary valve, reformer inlet valves, inlet guide vanes, damper(s), bed ash outlet conveyor, catalyst and/or oxidizer feed conveyor which may be pressurized, optional lime feed conveyor, Steam system, Boiler feed water system, Sweetwater condenser, attemperator system, Pressure Swing Absorbers, Oxygen concentrator(s), CO2/H2/Oxygen drier(s), compressor(s), pump(s), blower(s), conveyor(s), refrigeration system(s) for liquefaction (H2/LOX/CO2); valving, flow metering and/or measuring and/or block and bleed valving system(s), Kat Seal isolation system, Vibration monitoring for rotating machinery, magnetic levitation bearings, bearing temperature sensor(s), Variable speed controllers for all blowers and or fans, steam turbine, condenser, Auxiliary Steam methane reformer(s), rankine cycle systems and/or heat recovery units, Programmable logic controllers (PLC), Distributed control system(s)) DCS), bag filter unit(s), bed material feeder system(s), generator system(s), synchronizer(s), over-speed trip, multiphase, single phase, three phase, nine pole, twenty seven pole, alternating current (A.C.), Direct Current (D.C.), Inverter(s), Power Inverter(s), switchgear, diode(s), power feed monitoring system(s), Tie Breaker(s), MVARs, Ampere(s), voltage, frequency, hertz, temperature(s), power supplies, battery storage and/or back up system(s), U.P.S. system(s), power conditioning systems, transformer(s), buss duct, cable(s), conductor(s), motor overloads (MOL), motor control center(s)(MCC), fuse(s), breakers, circuit breakers, relays, transfer switches, automatic transfer switches, switches, coils, rectifiers, variable speed drives (VFD), contactors, auxiliary contactors, indicators, disconnects, start/stop buttons, emergency stop device(s), starter(s), power distribution centers, computer(s), processor(s), processor(s) with memory, peripheral devices such as printer(s), monitors, keyboards, mouse, optical reader(s), memory cards, Graphics processing unit (GPU), GPUPU, video monitoring system(s), Infrared video monitoring, camera(s), high speed camera(s), digital camera(s), remote monitoring and/or wireless communication systems by radio and/or light, antennae, self adjusting antennae(s), an array of antennae(s).

Figure 9:
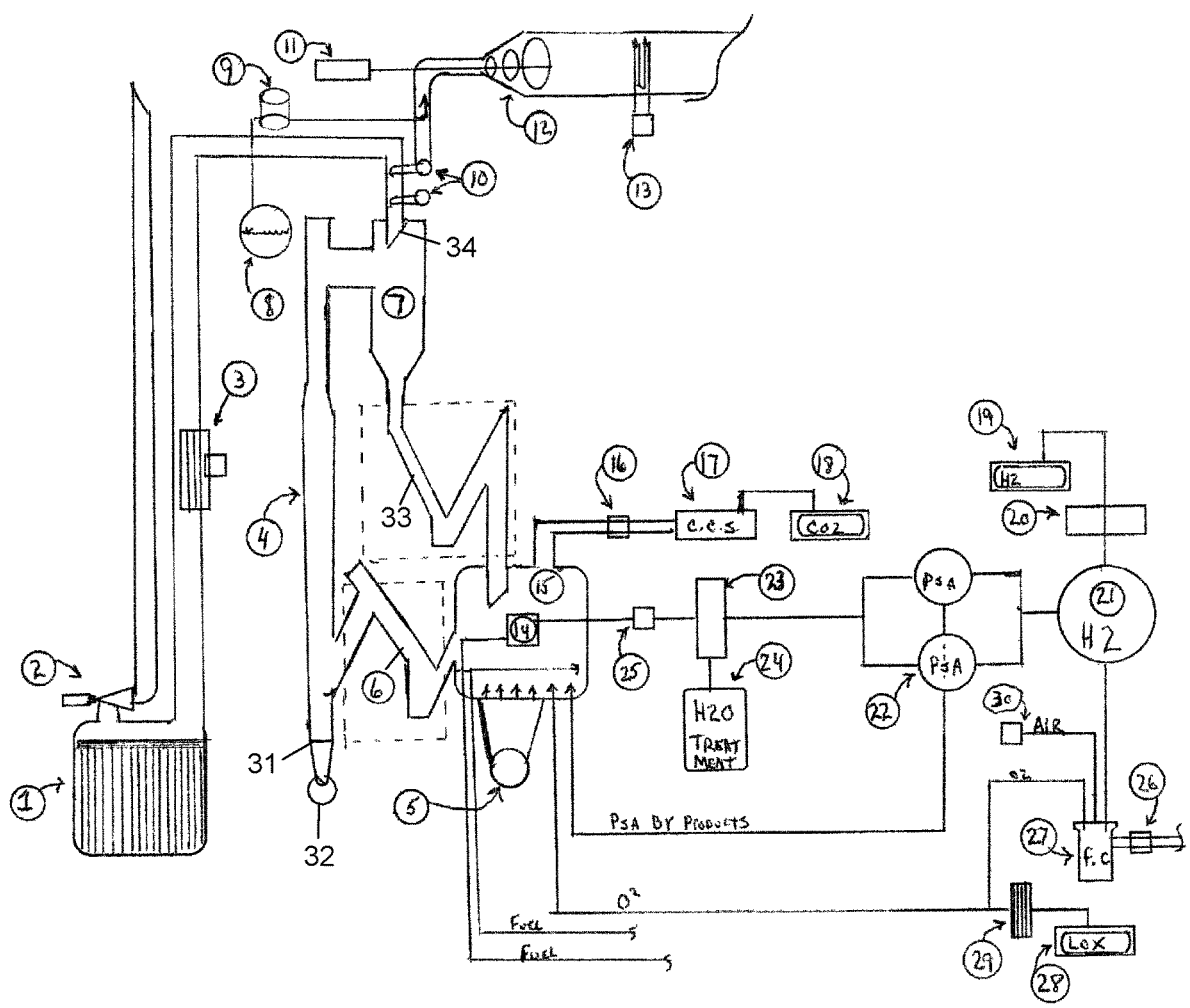
FIG. 9 shows a schematic of the Onboard Internally Recirculating Chemical Looping Combustion System (IR-CLCS).

Review of Depictions; FIG. 9

On FIG. 9, Item #1, is the Draft Bag Cleaning System, it shall remove any particulate matter which may escape from the system, and filter it out. This system shall consist of two sides, and/or flow diversion path, so that one side is actively cleaning while the other is automatically cleaning itself, by back blowing bag filters. This method may work on timed cycle, or by pressure switch, when predetermined pressure build up occurs, the switch from filtering to cleaning happens automatically.

On FIG. 9, Item #2, is the induced draft blower, this blower will be controlled by variable speed drive, to control blower speed and volume, so as to balance draft along with drop-out cyclone pressure, so not to create negative pressure in flow zone.

On FIG. 9, Item #3, is a Rankine Cycle waste heat recovery system. It will capture waste heat via heat exchanger, and transfer that heat to useful energy via a turbo-expander coupled to an electrical generator. The system is self enclosed, and the internal gas and/or fluid is looped internally, constantly re-circulating, attracting waste and expelling thru turbo-expander. Increasing overall efficiency.

On FIG. 9, Item #4, is the Oxidizer reformer, the catalyst is returned from fuel reformer #15 via the KAT Seal system, it is introduced in proper volumes (via speed and bucket and/or auger size) into the near bottom of the oxidizer reformer #4. Catalyst is met with updraft air from blower below, distributed air via an air distribution grid for even flow, catalyst is suspended and lifted by air, while regeneration is occurring, and catalyst is pneumatically transferred to the drop-out cyclone vessel, where the rate of air flow (feet per second; FPS) is dramatically reduced due to drop-out cyclone #7 vessel volume, and catalyst is "Dropped" by gravity into the vessel.

On FIG. 9, Item #5, is the Bed Blower for the oxidizer reformer #4, this air blower shall be for re-oxidization of catalyst in the chemical looping combustion system. The oxidizer blower may have a variable speed drive for optimum FPS control, so as to not over nor under speed air flow thru oxidizer reformer.

On FIG. 9, Item #6, is the KAT SEAL System. There are two (2) Kat Seal systems on this chemical looping combustion system. Similar, but different seal and/or isolation is created. One seal is between the drop-out cyclone #7 and the fuel reformer #15. Another seal is between the fuel reformer #15 and the oxidizer reformer #4. The KAT SEAL systems may use single axle drive as per drawing on displayed FIG. 21 or on FIG. 22, both single shaft designs will lift measured quantities of catalyst from lower section, and deposit and/or drop off into oxidizer chute via gravity. The KAT SEAL system may also use duel (2) axle system as per drawing displayed on FIG. 23 or on FIG. 24; both duel axle and/or two shaft designs will lift measured quantities of catalyst from lower section, and deposit and/or drop off into oxidizer chute via gravity. All four; FIG. 21, 22, 23, 24 may be powered by electric motor(s), hydraulic motor(s), pneumatic drive(s), all may use gear reduction or direct drive, chain drive, all may use variable speed drives for operational speed control, all may be positioned from horizontal axis up to vertical axis, thus every angle in a 180* range is available to system, for gravity assist. Bucket and auger and/or screw size may vary, since system has scalable out-put, the sizes will be adjusted accordingly. The KAT SEAL System may have optional air jets, these air jets will assist if catalyst is stubborn or may have moisture contained, causing blockage, jets will assist breaking blockage to resume normal catalyst transfer.

On FIG. 9, Item #7, this is the Drop-Off Cyclone, air flow FPS is reduced as air from oxidizer reformer #4 is transitioned into Drop-off cyclone #7, this acts as a pneumatic transfer, and the catalyst is no longer air-born, and drops via gravity into the #6 KAT SEAL System, re-dux catalyst will then be used at first as a seal, then the KAT SEAL systems will transfer catalyst into the #15 fuel reformer.

On FIG. 9, Item #8, this is the steam drum, this chemical looping combustion system will generate heat, and the water walls and optional wing walls in the two (2) reformers will transfer heat and/or steam into the upper steam drum. The entire chemical looping combustion system is scalable, therefore the steam drum size will vary accordingly.

On FIG. 9, Item #9, this is the distillation exchanger. This uses incoming boiler feed water, to cool steam from the steam drum, creating distilled pure water. This distilled water will be used to cool the exit steam, a form of attemperation, lowering the temperature while maintaining steam pressure; utilizing an inline sparger, with-in the exit steam line, prior to entering the steam turbine #12.

On FIG. 9, Item #10, these are optional pre and post superheaters. If steam from drum is saturated and requires further heating, a pre and/or post superheater option is available.

On FIG. 9, Item #11, is an electrical generator, this generator is powered by the shaft out-put power of the steam turbine. The chemical looping combustion system is scalable in size, therefore out-put shaft horse power and/or generator will also require proper sizing.

On FIG. 9, Item #12, is the steam turbine, this turbine is powered by pounds per hour of steam produced by the chemical looping combustion system. System Size is scalable, therefore steam turbine is scalable.

On FIG. 9, Item #13, is a Rankine Cycle waste heat recovery system. It will capture waste heat via heat exchanger, and transfer that heat to useful energy via a turbo-expander coupled to an electrical generator. The system is self enclosed, and the internal gas and/or fluid is looped internally, constantly re-circulating, attracting waste and expelling thru turbo-expander. Increasing overall system efficiency.

On FIG. 9, Item #14, is a steam methane reformer (SMR), with-in the fuel reformer. The SMR has a natural gas feed, and with-in the process natural gas is cracked and/or reformed in various gas's, such as Hydrogen, Carbon Dioxide, carbon Monoxide, propane, butane, ethane, hydrogen sulfide. These hot gases will exit, and waste heat recovered by #25 Rankine Cycle heat exchanger, and gas's will be further processed and/or separated.

On FIG. 9, Item #15, is the fuel reformer, the feeds into this reformer are as follows: Natural Gas, Oxygen, PSA #22 by-products, air, catalyst from #7 drop-out cyclone. The chemical combustion reaction occurs few feet up from the bottom, where gas's and catalyst meet. The exit gas is mainly carbon dioxide and water vapor, which leaves via suction from Carbon Capture System #17. The other exit path is to KAT SEAL system #6, seal from fuel reformer #15 to oxidizer #4.

On FIG. 9, Item #16, is a Rankine Cycle waste heat recovery system. It will capture waste heat via heat exchanger, and transfer that heat to useful energy via a turbo-expander coupled to an electrical generator. The system is self enclosed, and the internal gas and/or fluid is looped internally, constantly re-circulating, attracting waste and expelling thru turbo-expander. Increasing overall system efficiency.

On FIG. 9, Item #17, is the Carbon Dioxide capture and separate system. This system will separate the carbon dioxide and water via a knock out drum with an internal demister pad, then pass thru an alternating desiccant drier system to dehydrate $CO_2$, then it will refrigerate and convert to liquid carbon dioxide and place into #18 exchangeable storage tanks with self contained refrigeration units to maintain liquid $CO_2$, with out venting. Power must be available near-by to power refrigeration system. This pure $CO_2$ has some secondary markets.

On FIG. 9, Item #19, this is a Liquid Hydrogen Storage tank with self contained refrigeration unit to re-liquify vapor pressure build-up, back to Liquid Hydrogen. Power must be available near-by to power refrigeration system. This is pure dehydrated Hydrogen, this product has market demand.

On FIG. 9, Item #20, this is a Hydrogen liquefaction unit, the Hydrogen gas from Storage Tank #21, is refrigerated and Hydrogen gas is liquefied and transferred into exchangeable tank #19.

On FIG. 9, item #21, this is Pure Hydrogen Gas from Chemical Looping Combustion process system, this gas will be used as fuel for the fuel cell #27 or it will be liquefied by #20 and sent to exchangeable storage tank #19 for resale.

On FIG. 9, Item #22, this is the Pressure Swing Absorbers, one is in service, while other is exhausting by-products into #15 fuel reformer. While one is in service, the Gas mixture is sent up the absorber, and the palladium catalyst, which separates out Hydrogen gas up to top, and by-products are separated out to fuel reformer.

On FIG. 9, Item #23, is the saturated pure water steam injection. This process, using ultra-pure water, increases Hydrogen production.

On FIG. 9, Item #24, this is the water purification system. Water is filtered by carbon filter, then de-mineralized, then de-ionized, then reverse osmosis process, and treated with Ultraviolet light to produce ultra pure 0.0 micro-siemens water. This is expensive water, it takes 4 gallons of water to make 1 gallon of purified water. This purified water is for Hydrogen production via saturated steam.

On FIG. 9, Item #25, is a Rankine Cycle waste heat recovery system. It will capture waste heat via heat exchanger, and transfer that heat to useful energy via a turbo-expander coupled to an electrical generator. The system is self enclosed, and the internal gas and/or fluid is looped internally, constantly re-circulating, attracting waste and expelling thru turbo-expander. Increasing overall system efficiency.

On FIG. 9, Item #26, is a Rankine Cycle waste heat recovery system. It will capture waste heat via heat exchanger, and transfer that heat to useful energy via a turbo-expander coupled to an electrical generator. The system is self enclosed, and the internal gas and/or fluid is looped internally, constantly re-circulating, attracting waste and expelling thru turbo-expander. Increasing overall system efficiency.

On FIG. 9, Item #27, is a Fuel Cell, there are multiple different fuel cell(s) with different internals, this application includes multiple fuel cells that use Hydrogen Gas and oxygen feed to increase efficiency. This fuel cell shall also have an air feed, via compressed air, and oxygen may be mixed with air, or separate oxygen inlet, plus an oxygen concentrator may also be used to increase oxygen percentage in the air inlet system. This oxygen concentrator may also be use for fuel reformer inlet also.

On FIG. 9, Item #28, is a liquid oxygen storage tank. This exchangeable storage tank may be used to feed oxygen (vapor via vaporizer #29) to the fuel reformer #15 and the fuel cell #27. Load cells may be used to measure exchangeable tank(s) weight; for each exchangeable tank with-in this system.

On FIG. 9, Item #29, this is the Liquid oxygen vaporizer, this provides ambient heat to liquid oxygen from storage tank #28, and converts it to oxygen vapor.

Figure 10:
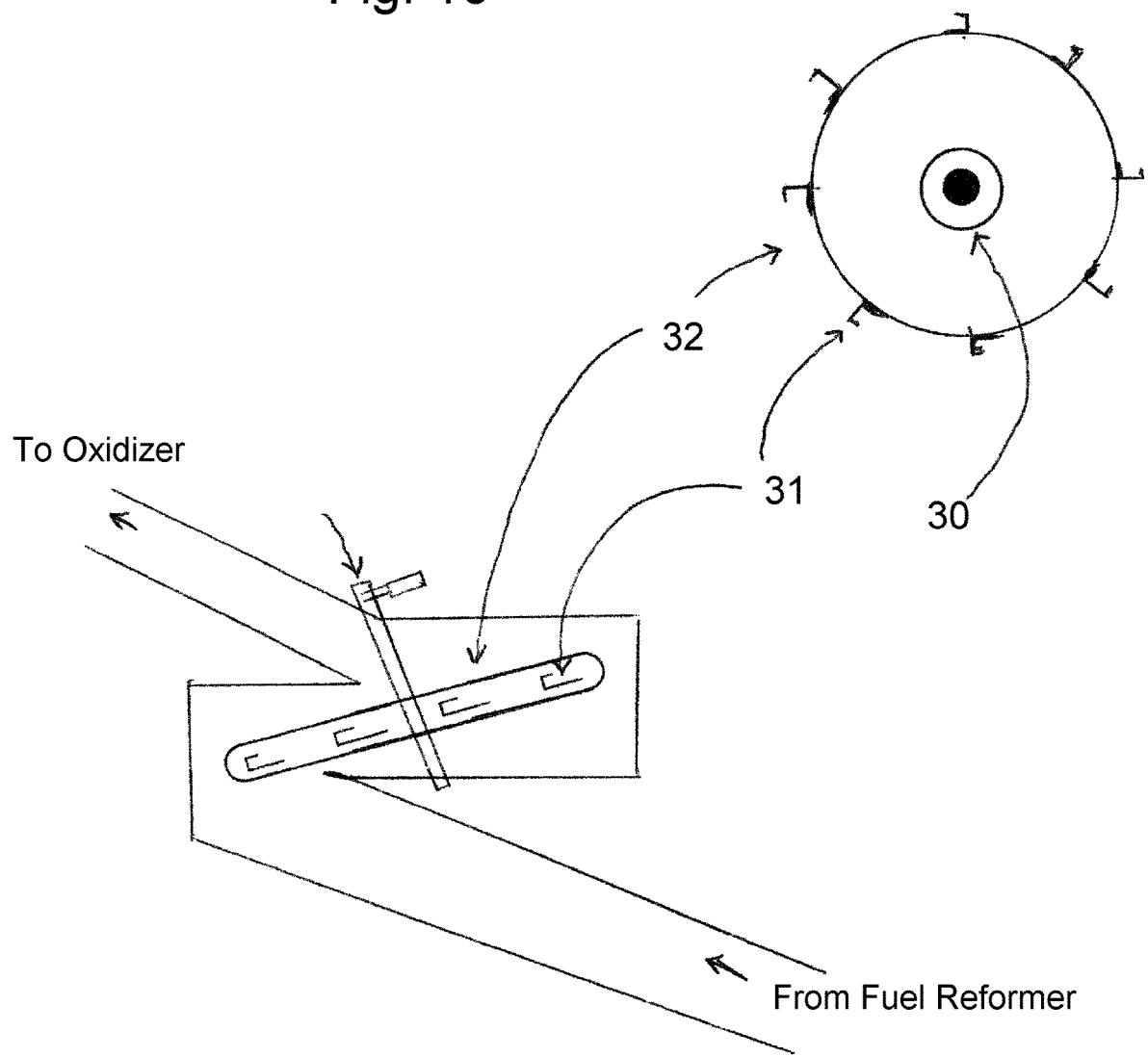
FIG. 10 shows a bucket wheel in IRCLCS.
Figure 11:
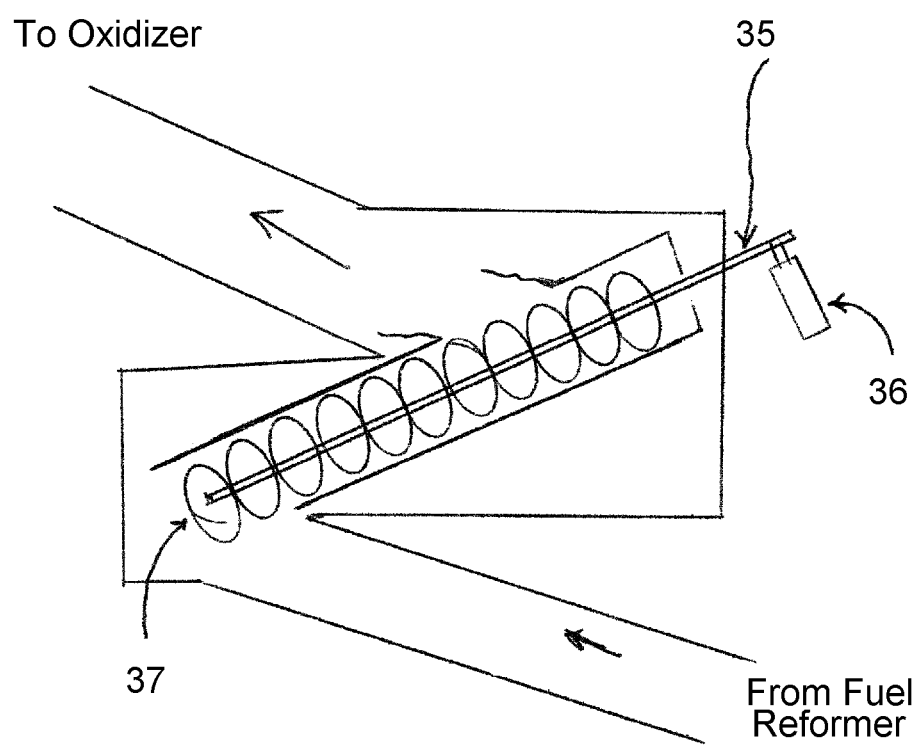
FIG. 11 shows a screw lift in IRCLCS.
Figure 12:
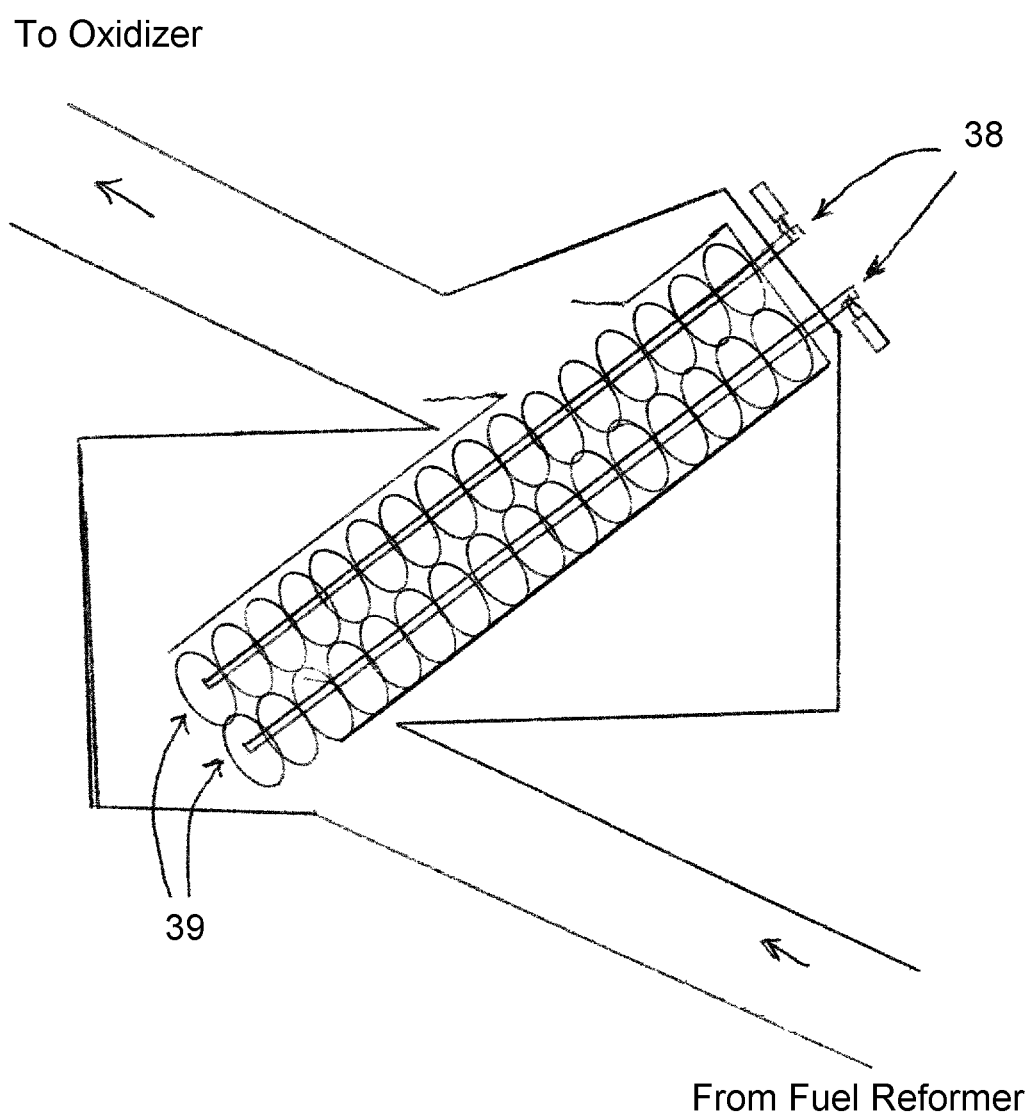
FIG. 12 shows a double screw lift in IRCLCS.
Figure 13:
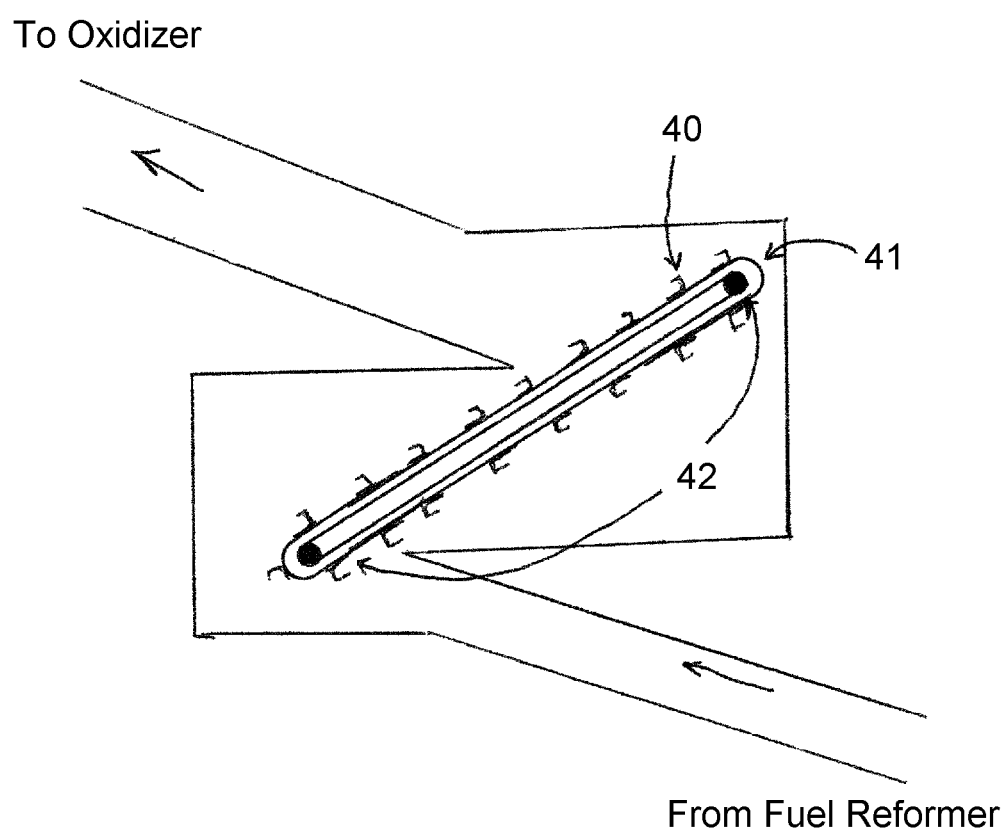
FIG. 13 shows a belt lift in IRCLCS.
Figure 14:
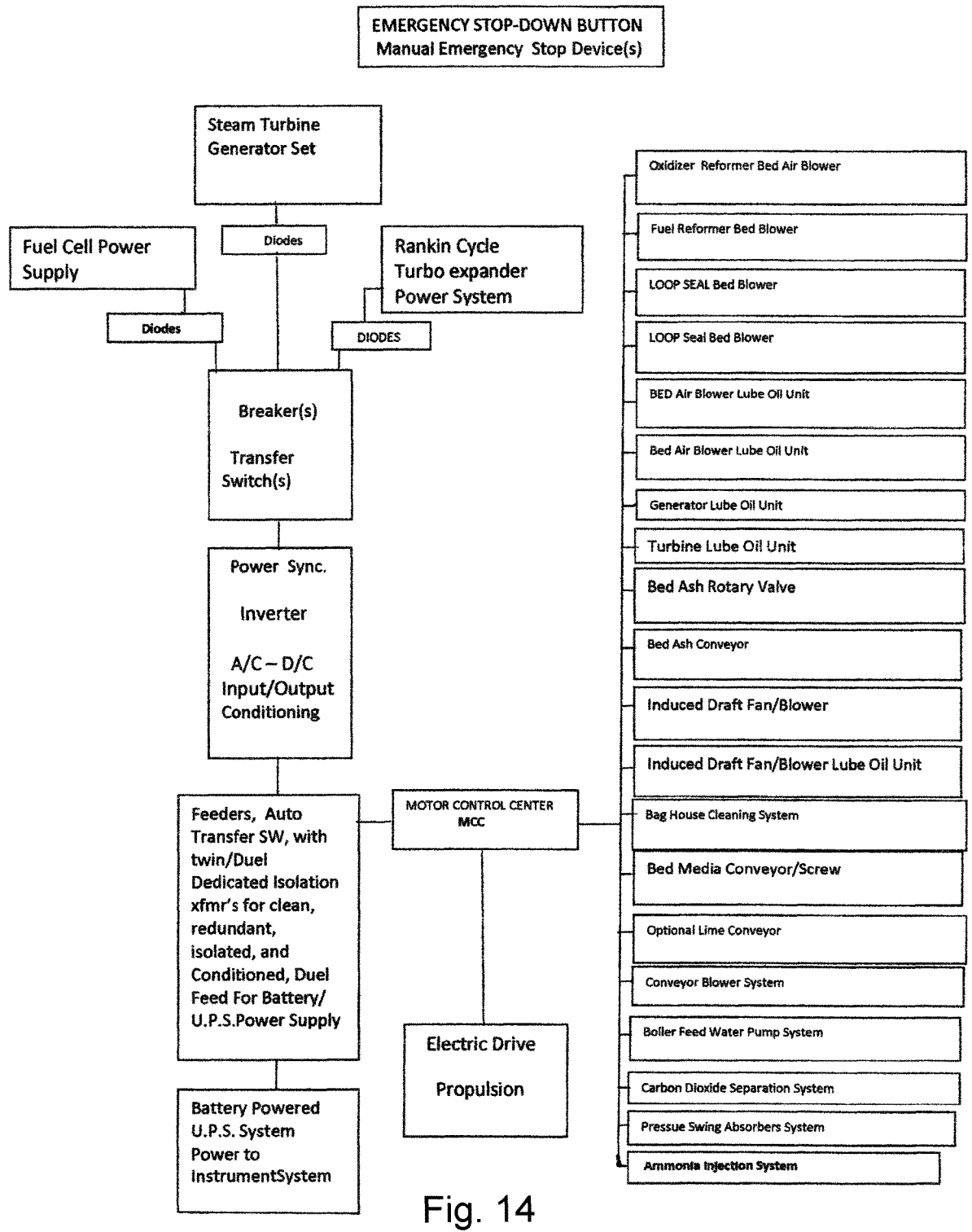
FIG. 14 is a block diagram of a safety shutdown system.

FIG. 9 shows a schematic of the Onboard Internally Recirculating Chemical Looping Combustion System (IRCLCS). FIG. 10 shows a bucket wheel in IRCLCS. FIG. 11 shows a screw lift in IRCLCS. FIG. 12 shows a double screw lift in IRCLCS. FIG. 13 shows a belt lift in IRCLCS. FIG. 14 is a block diagram of a safety shutdown system.

Two (2) Hopper feeders, both with bottom outlet to screw conveyor(s), located at an elevation of at least half distance up on rear (left) side of Oxidizer reformer #4, for gravity assist. The screw and/or auger conveyors will feed into oxidizer reformer #4 thru pneumatically operated slide gate valve(s) with air seal.

One (1) hopper feeder will supply fresh catalyst into #4 oxidizer reformer, at an elevation close to KAT SEAL #6 entrance elevation. One (1) hopper feeder will supply fresh lime, for Sulphur management, into #4 oxidizer reformer, at an elevation close to KAT SEAL #6 entrance elevation On the underside of fuel reformer #15; a pneumatically operated slide gate valve with air seal, which has another rotary valve inline below the slide gate, which will meter out spent catalyst and/or ash from system. The rotary valve may be electric, hydraulic, or pneumatic operated.

The chemical looping combustion system catalyst is prone to Sulphur poisoning, therefore Liquified Natural gas is the preferred fuel. If pipeline Natural gas is to be used; it must be pretreated to remove Sulphur, Mercury, and Hydrogen Sulfide, as these are toxic to the catalyst with-in the system.

FIG. 10 shows a bucket wheel in IRCLCS. FIG. 11 shows a screw lift in IRCLCS.

FIG. 12 shows a double screw lift in IRCLCS. FIG. 13 shows a belt lift in IRCLCS.

FIG. 14 is a block diagram of a safety shutdown system.

Also, auxiliary SMR reformers may be on stand-by, if steam turbine power is not necessary, multiple steam reform methane reformers may be used to create more Hydrogen, for resale. Logistic will be figured into when this production is required. Such as long port call, since chemical looping combustion process is a steady state continuous process, it is best to utilize steam, if turbine power is not needed.

The Internally Re-Circulating Chemical Looping Combustion System provides clean efficient power, with near and/or zero emissions. Evolving, Emerging, and merging old and new technologies will provide safe, clean, affordable $21^{st}$ century vehicles, for work, transits, and recreation.

I claim:

1. A catalytic internally recirculating chemical looping combustion system (IRCLCS) adapted to convert natural gas into at least steam, hydrogen, water and carbon dioxide comprising:
    a fuel reformer (15) chamber including a steam methane reformer (SMR) (14), the fuel reformer adapted to accept natural gas and oxygen, the fuel reforming chamber reformer (15) also containing injected oxidized metal oxides to produce steam and carbon dioxide;
    a steam turbine (12) vapor connected to the fuel reformer (15) chamber, said steam turbine (12) configured to drive an electrical generator (11);
    a circulating and recirculating oxidizer generation and oxidizer reformer system (4) configured to re-oxidize the metal oxides and transfer them via a first catalyst seal (KAT SEAL)(6), a bed (31) and air blowers (5), (32) to a cyclone vessel (7) by pneumatic transfer and gravity drop out through a second KAT SEAL (33) into the fuel reformer (15) ;
    a heat capturing system configured to capture heat at a flue outlet (34) at top of the cyclone vessel and transferring it to pre- and post- heater headers (10) configured to provide steam to the steam turbine (12).

2. The system of claim 1, further comprising a waste heat capturing system operating on a Rankine Cycle.

3. The system of claim 1, wherein natural gas is converted to hydrogen by a steam methane reformer (14).

4. The system of claim 3, wherein the hydrogen is stored as either hydrogen gas or liquid hydrogen.

5. The system of claim 1, wherein the carbon dioxide is stored as either carbon dioxide gas, liquid carbon dioxide.

6. The system of claim 1, further comprising a fuel cell converting the hydrogen to electric energy via injected air or oxygen.

7. A catalytic internally recirculating chemical looping combustion system (IRCLCS) adapted to convert natural gas into at least steam, hydrogen, and carbon dioxide comprising:
- a fuel reformer (15) including a steam methane reformer (SMR) (14), the fuel reformer adapted to accept natural gas and oxygen, the fuel reformer (15) also containing metal oxides to produce steam and carbon dioxide;
- a steam turbine (12) vapor connected to the fuel reformer (15), said steam turbine (12) configured to drive an electrical generator (11);
- a circulating and recirculating oxidizer generation and oxidizer reformer (4) configured to re-oxidize the metal oxides and transfer them via a first catalyst seal (KAT SEAL)(6), a bed (31) and air blowers (5), (32) to a cyclone vessel (7) by pneumatic transfer and gravity drop out through a second KAT SEAL (33) into the fuel reformer (15);
- a heat capturing system configured to capture heat at a flue outlet (34) at top of the cyclone vessel and transferring it to pre- and post- heater headers (10) configured to provide steam to the steam turbine (12);
- wherein the first KAT SEAL (6) isolates the oxidizer reformer (4) from the fuel reformer (15), and the second KAT SEAL (33) isolates the fuel reformer from the oxidizer reformer.

8. The system of claim 7 wherein, the first KAT SEAL (6) transfers the metal oxides from the fuel reformer to the oxidizer reformer, and the second KAT SEAL (33) transfers the re-oxidized metal oxides from the oxidizer reformer to the fuel reformer.

9. The system of claim 8, wherein, the first or second KAT SEAL comprises a single shaft lifting device.

10. The system of claim 8, wherein, the first or second KAT SEAL comprises a double shaft lifting device.

11. The system of claim 9, wherein, the single shaft lifting device comprises a screw, auger or circular wheel with buckets.

12. The system of claim 10, wherein, the double shaft lifting device comprises one or more screws, augers or bucket chains.

13. The system of claim 8, wherein, the lifting device of the first or second KAT SEAL is positioned at an angle from horizontal to vertical.

14. The system of claim 8, wherein, the lifting device of the first or second KAT SEAL is powered by an electric, hydraulic or pneumatic drive.

15. The system of claim 8, wherein, the lifting device of the first or second KAT SEAL includes a gear reduction drive.

16. The system of claim 8, wherein, the lifting device of the first or second KAT SEAL includes forward and reverse motion.

17. The system of claim 8, wherein, the lifting device of the first or second KAT SEAL includes a variable speed drive.

18. The system of claim 7 further comprising a slide gate valve with an air seal, and a rotary valve below the slide gate valve, configured to meter out spent metal oxide catalyst or ash.

19. The system of claim 7 further comprising a feeder configured to supply fresh metal oxide catalyst into the oxidizer reformer.

* * * * *